(12) United States Patent
van den Nieuwelaar et al.

(10) Patent No.: US 6,811,478 B2
(45) Date of Patent: Nov. 2, 2004

(54) EVISCERATING MEMBER, DEVICE AND METHOD FOR PROCESSING A CLUSTER OF VISCERA OF A SLAUGHTERED ANIMAL

(75) Inventors: Adrianus Josephes van den Nieuwelaar, Gemert (NL); Cornelis Dirk van Harskamp, Boxmeer (NL); Bastiaan Wilhelmina Johannes Elizeus Josephus Drabbels, Vierlingsbeek (NL); Hendrikus Antonius Theresia Petrus Hetterscheid, Boxmeer (NL)

(73) Assignee: Stork PMT, B.V. (NL)

( * ) Notice: Subject to any disclaimer, the term of this patent is extended or adjusted under 35 U.S.C. 154(b) by 0 days.

(21) Appl. No.: 10/197,074

(22) Filed: Jul. 17, 2002

(65) Prior Publication Data

US 2002/0177396 A1 Nov. 28, 2002

Related U.S. Application Data

(63) Continuation of application No. PCT/NL01/00037, filed on Jan. 18, 2001.

(30) Foreign Application Priority Data

Jan. 18, 2000 (NL) .............................. 1014100
Jul. 11, 2000 (NL) .............................. 1015682

(51) Int. Cl.$^7$ ................................. A22B 5/18
(52) U.S. Cl. ..................................... 452/117
(58) Field of Search .................. 452/117, 106, 452/118, 134, 160, 107, 111, 115, 123

(56) References Cited

U.S. PATENT DOCUMENTS

| | | | |
|---|---|---|---|
| 1,798,585 A | 3/1931 | Bookheim | |
| 2,327,224 A | * 8/1943 | Spang | 452/118 |
| 3,685,096 A | * 8/1972 | Harben, Jr. | 452/118 |
| 3,879,803 A | * 4/1975 | Verbakel | 452/117 |
| 3,886,635 A | * 6/1975 | Meyn | 452/117 |
| 3,983,601 A | * 10/1976 | Verbakel | 452/118 |
| 4,131,973 A | * 1/1979 | Verbakel | 452/117 |
| 4,516,148 A | * 5/1985 | Barth | 257/735 |
| 4,516,290 A | * 5/1985 | van Mil | 452/118 |
| 5,026,317 A | * 6/1991 | Kennedy | 452/106 |
| 5,186,679 A | 2/1993 | Meyn | |

(List continued on next page.)

FOREIGN PATENT DOCUMENTS

| | | |
|---|---|---|
| EP | 0 094 724 A2 | 11/1983 |
| EP | 0 178 272 A1 | 4/1986 |
| EP | 0 539 134 A1 | 4/1993 |
| EP | 0 562 661 A1 | 9/1993 |
| EP | 0 587 253 A2 | 3/1994 |
| EP | 0 839 455 A1 | 5/1998 |
| WO | WO 01/52659 A1 | 7/2001 |

OTHER PUBLICATIONS

International Search Report in related PCT/NL01/00037.
Novelty Search Report in priority Application No. NL 1015682.

*Primary Examiner*—Thomas Price
(74) *Attorney, Agent, or Firm*—Tywanda L. Harris; Kristin L. Johnson; Kilpatrick Stockton LLP

(57) ABSTRACT

An eviscerating member for processing a cluster of viscera of a slaughtered animal comprises two jaw parts to be moved at least partially into and out of the body cavity of the slaughtered animal. The jaw parts can move with respect to one another between an open position, in which a first jaw part is situated at a distance from the second jaw part, and a closed position, in which the first jaw part and the second jaw part substantially clamp onto part of the cluster of viscera. The eviscerating member also comprises a support mechanism supporting the jaw parts, and an actuating mechanism moving the jaw parts with respect to one another between the open position and the closed position.

41 Claims, 17 Drawing Sheets

U.S. PATENT DOCUMENTS

| | | | |
|---|---|---|---|
| 5,549,521 A | * | 8/1996 | van den Nieuwelaar et al. .......................... 452/118 |
| 5,569,072 A | | 10/1996 | Tieleman et al. |
| 5,707,280 A | * | 1/1998 | Tieleman et al. ........... 452/117 |
| 5,766,063 A | * | 6/1998 | Hazenbroek et al. ....... 452/117 |
| 6,152,816 A | * | 11/2000 | van den Nieuwelaar et al. ......................... 452/177 |

\* cited by examiner

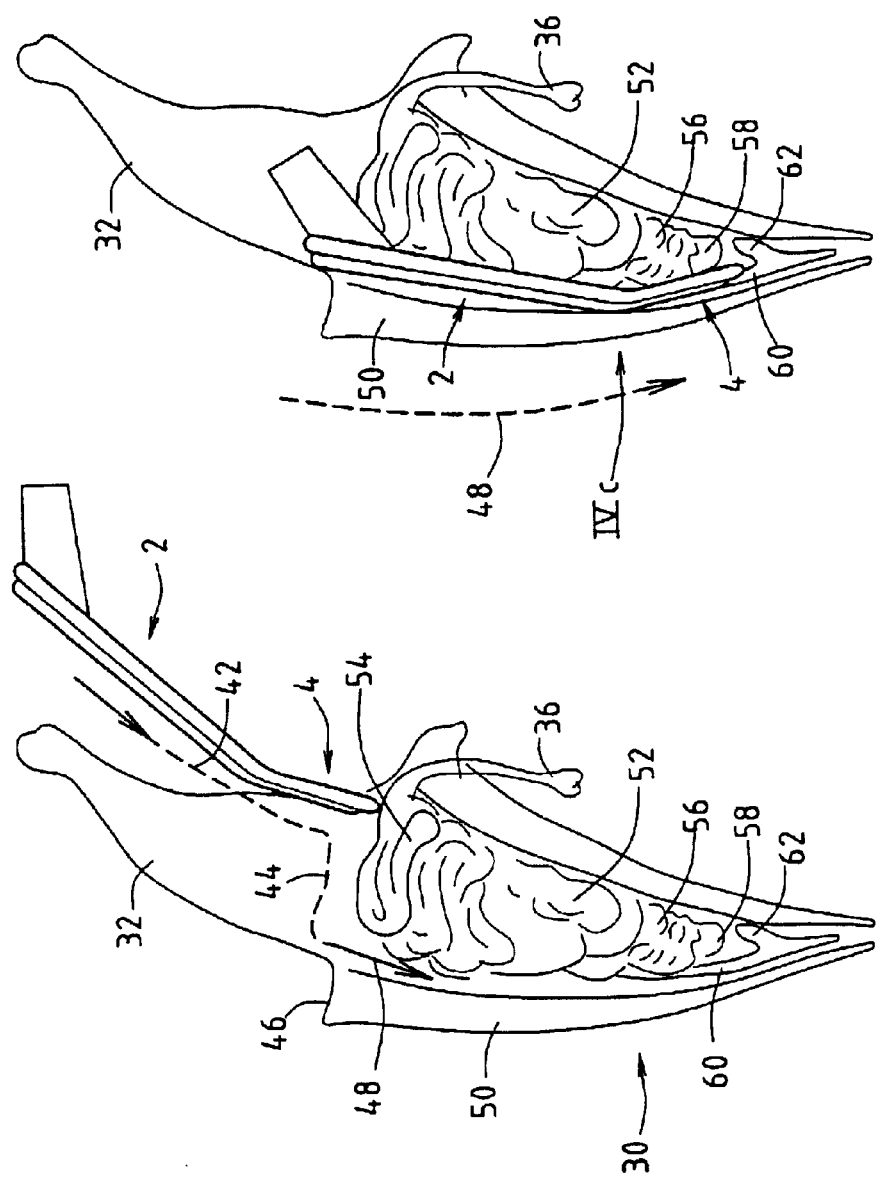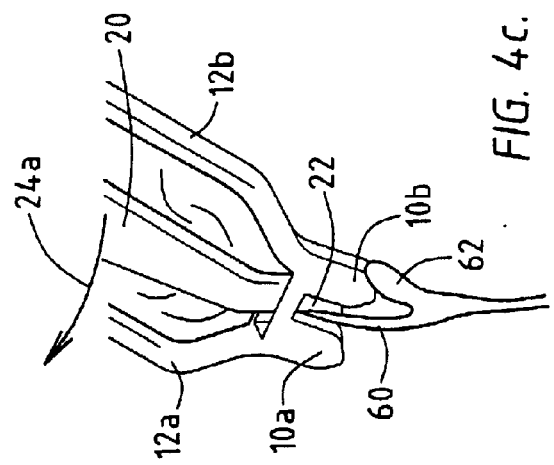

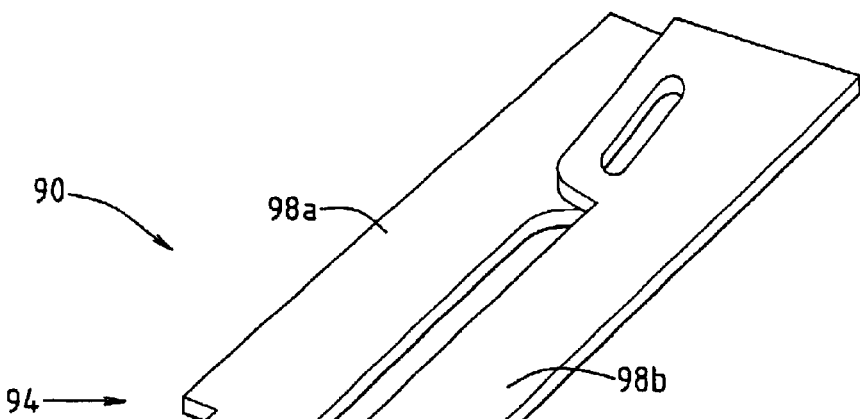
FIG. 8.
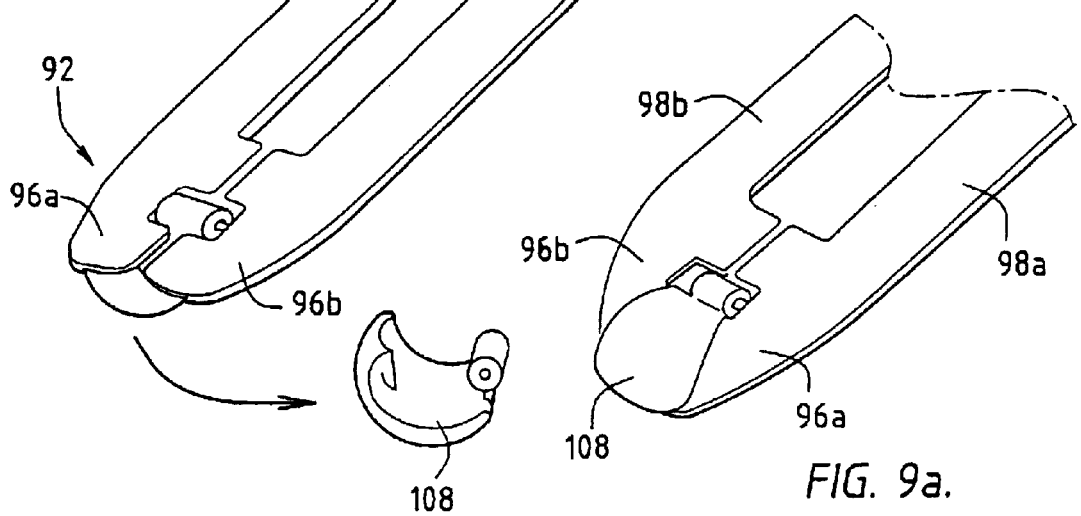
FIG. 9a.
FIG. 9b.
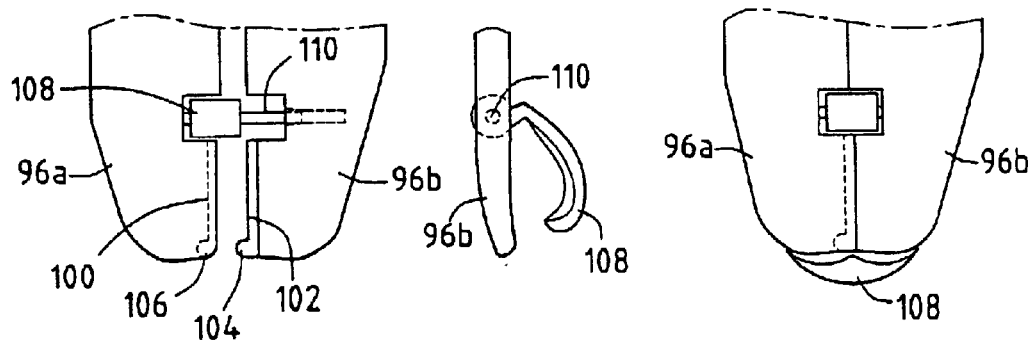
FIG. 10a.    FIG. 10b.    FIG. 10c.

US 6,811,478 B2

EVISCERATING MEMBER, DEVICE AND METHOD FOR PROCESSING A CLUSTER OF VISCERA OF A SLAUGHTERED ANIMAL

CROSS-REFERENCE TO RELATED APPLICATION

This is a continuation application of PCT/NL01/00037 filed Jan. 18, 2001, which PCT application claim priority of Netherlands patent application no. 1,014,100 filed Jan. 18, 2000 and Netherlands patent application no. 1,015,682 filed Jul. 11, 2000, both herein incorporated by reference.

FIELD OF THE INVENTION

The present invention relates to an eviscerating member for processing a cluster of viscera of a slaughtered animal. The invention also relates to a device which comprises a number of such eviscerating members, and to a method for processing a cluster of viscera of a slaughtered animal with the aid of the eviscerating member. Wherever the following text uses the term "above" a specific organ which forms part of the viscera, the position of the organ in the slaughtered animal in the natural, standing position of this animal is intended to be used as reference.

DISCUSSION OF THE PRIOR ART

Numerous embodiments of eviscerating members are known from the prior art.

Netherlands patent application 9,100,153 describes an eviscerating member for poultry which comprises two substantially symmetrical C-shaped brackets which are hingedly connected to one another at their free ends and can be moved by an actuating means between a closed position, in which the brackets extend parallel to and next to one another, and an open position, in which the brackets have each pivoted through 90 degrees or less in opposite directions with respect to the closed position.

When the eviscerating member which is known from Netherlands patent application 9,100,153 is being used for an eviscerating operation, the brackets are placed in their open position and are moved into the abdominal cavity of a bird hanging by its legs, towards a position which is such that, when the brackets are being transferred to their closed position, the gullet of the cluster of viscera of the bird is gripped between the brackets in the vicinity of the front end of the eviscerating member. During a first phase involving moving of the brackets into the bird in their open position, and during a second phase involving moving the brackets from the open position to the closed position inside the abdominal cavity of the bird, large amounts of connective tissue in the viscera is broken, and viscera are moved out of their natural position before the closed position is reached. Consequently, the viscera are damaged and the eviscerating operation is difficult to reproduce. A particular drawback is that the location where the gullet is taken hold of varies within a wide range and that when the brackets are being transferred from their open position to their closed position, organs other than the gullet, for example intestines, unintentionally become jammed between the brackets and become damaged, so that their contents are spilled and may contaminate the organs and other parts of the slaughtered animal.

European patent application 587,253 describes an eviscerating member having an assembly of an eviscerating spoon and a fixing member. The eviscerating spoon can pivot between two limit positions. The fixing member is positioned behind the eviscerating spoon and comprises two jaw parts which can move with respect to one another between an open position, in which a first jaw part is situated at a distance from the second jaw part, and a closed position, in which the first jaw part and the second jaw part are driven towards one another.

While the eviscerating member which is known from European patent application 587,253 is being used, the assembly of the eviscerating blade and the fixing member is moved into the abdominal cavity of a bird hanging by its legs along the breast or back side of the bird until the fixing member is in its open position at the level of the gullet. Then, the eviscerating spoon is pivoted, so that the cluster of viscera is pushed upwards, and the fixing member is moved to its closed position, so that the gullet is gripped securely. Then, the assembly of the eviscerating spoon and the fixing member is moved out of the abdominal cavity, the cluster of viscera being entirely detached from the carcass of the bird and hanging from the fixing member by the gullet. In a subsequent processing step, the cluster of viscera is transferred to another fixing member. While the eviscerating spoon and the fixing member are being moved in the abdominal cavity of the bird, large amounts of connective tissue is broken and organs in the cluster of viscera are moved out of their natural position before the gullet is gripped securely.

European patent application 539,134 describes an eviscerating member having a substantially elongate, O-shaped bracket, referred to as a spoon, which comprises two C-shaped part-brackets. The part-brackets can be moved away from one another at their front sides.

While the eviscerating member which is known from European patent application 539,134 is being used for an eviscerating operation, the O-shaped bracket is moved into the abdominal cavity of a bird which is hanging by its legs along the breast side of this bird (with the C-shaped part-brackets resting against one another) in such a manner that when the eviscerating member is pulled back, the cluster of viscera is moved out of the bird. In the process, the cluster of viscera will usually at least partially pass through the O-shaped opening, so that part of the cluster of viscera is situated on one side of the bracket and another part is situated on the other side of the bracket. Since the bird, with the cluster of viscera still connected to it, follows a different path from the eviscerating member, the cluster of viscera is detached from the bracket as a result of the C-shaped part-brackets being moved apart after the eviscerating operation, preventing the eviscerating member from pulling the cluster of viscera off the bird. The eviscerating member is not intended to fix viscera, since the C-shaped part-brackets rest against one another during the eviscerating operation.

European patent application 839,455 describes an eviscerating member having a gripper means which comprises two jaw parts which can rotate about axes which are at an angle to one another. In an inactive position, the jaw parts are directed downwards and are situated at a distance from one another. In an active position, the jaw parts have been folded upward through approx. 90 degrees, the mutually facing edges of the jaw parts being driven towards one another on account of their angled axes of rotation.

When the eviscerating member which is known from European patent application 839,455 is used for an eviscerating operation, the jaw parts, in their inactive position, are moved into the abdominal cavity of a bird hanging by its legs, along the breast side of this bird. When the jaw parts have reached the neck area of the bird, the jaw parts are moved from the inactive position to the active position, the viscera being moved a short distance upwards and the gullet of the bird being clamped securely between the jaw parts. During this process, large amounts of connective tissue is broken and the viscera is moved out of its natural position before the gullet is clamped. Then, the cluster of viscera is moved out of the bird and the clamping of the gullet is eliminated, so that the cluster of viscera remains hanging from the carcass of the bird.

SUMMARY OF THE INVENTION

The object of the invention is to provide an eviscerating member which combines structural simplicity, a low consumption of material and a low cost price with robustness, flexible applications, a high level of effectiveness and good reproducibility of processing for slaughtered animals of different sizes.

This object is achieved according to the invention by means of an eviscerating member according to the appended independent claim.

Preferred embodiments of the eviscerating member are described in the appended dependent claims.

With regard to the covering member, it is pointed out that it can be used to good effect not only in eviscerating members according to the invention but also in other eviscerating members, such as the eviscerating members according to the prior art.

The abovementioned and other aspects, claims and advantages of the present invention will be more readily appreciated as the same becomes better understood by explanation in more detail with reference to the following description and considered in connection with the accompanying drawings of preferred embodiments of a device and method according to the invention for use on poultry. In the drawings, identical reference numerals in the various Figures denote identical components or components with an identical function.

BRIEF DESCRIPTION OF THE DRAWINGS

FIG. 4a shows, in a partial longitudinal section, a first phase of the use of the eviscerating member from FIGS. 1 and 2a–2e in a slaughtered bird.

FIG. 4b shows, in a partial longitudinal section, a second phase of the use of the eviscerating member from FIGS. 1 and 2a–2e in a slaughtered bird;

FIG. 4c shows a side view of the eviscerating member in the situation illustrated in FIG. 4b;

FIG. 8 shows a perspective view of a third embodiment of an eviscerating member according to the invention;

FIG. 9a shows a perspective view of a section of another side of the eviscerating member from FIG. 8;

FIG. 9b shows a perspective view of a component of the eviscerating member from FIG. 8;

FIG. 10a shows a side view of a section of the eviscerating member from FIG. 8, in its open position;

FIG. 10b shows another side view of a section of the eviscerating member from FIG. 8, in its open position;

FIG. 10c shows a front view of a section of the eviscerating member from FIG. 8, in its closed position;

DESCRIPTION OF THE PREFERRED EMBODIMENTS

Figure 1:
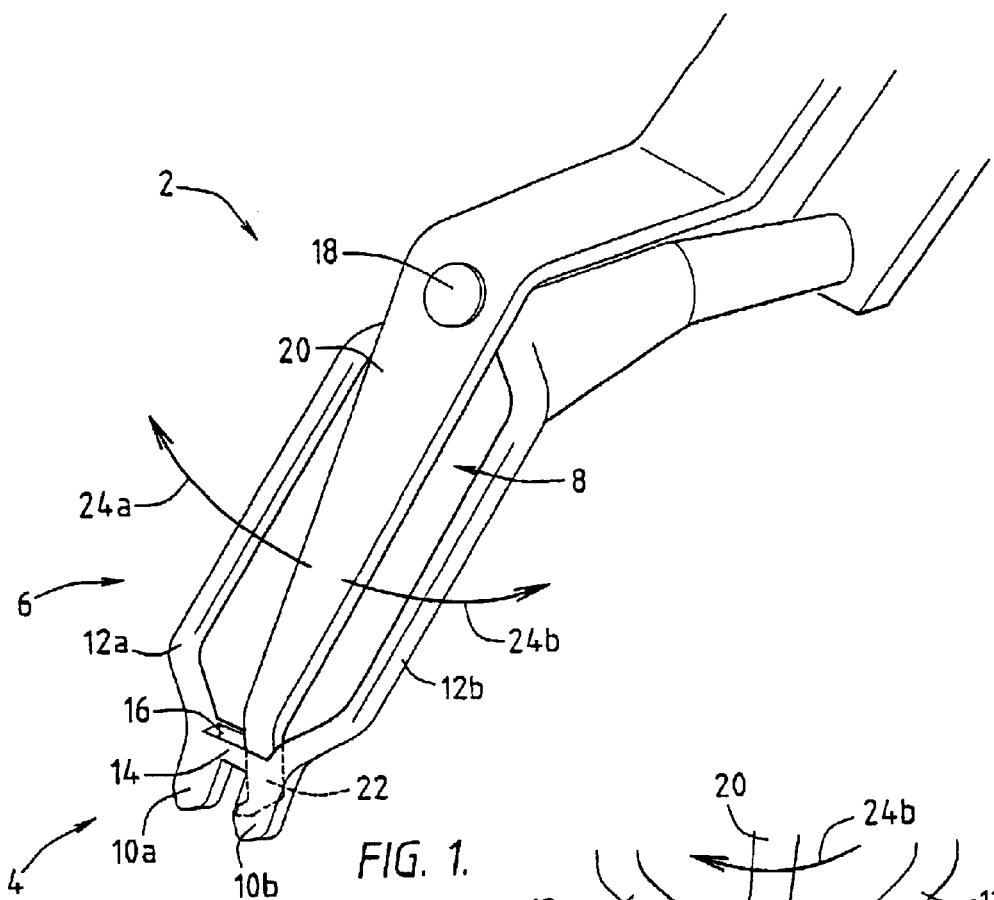
FIG. 1 shows a perspective view of a first embodiment of an eviscerating member according to the invention.

FIGS. 1 and 2a–2e show an eviscerating member 2 having an eviscerating head 4, a support member 6 and an actuating means 8. The eviscerating head 4 comprises 2 protuberances 10a, 10b which are each securely connected to an angled support arm 12a and 12b, respectively, and are connected to one another by a bridge 14. The eviscerating head 4 is also known as a spoon. The support arms 12a, 12b are fixedly connected to one another at their ends which are remote from the eviscerating head 4. The protuberances 10a, 10b and the bridge 14 are provided with a slot 16 in which a jaw part 22, which is connected to an actuating arm 20 which can hinge about a pin 18, can be moved to and fro in the directions of arrows 24a, 24b. The pin 18 is mounted at the location of the connection of the support arms 12a, 12b. At its free end, the jaw part 22 is provided with a hook-shaped projection 26.

Figure 2A:
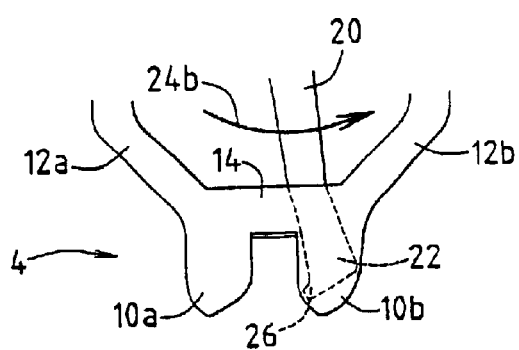
FIG. 2a shows a side view of a section of the eviscerating member from FIG. 1, in its open position.
Figure 2C:
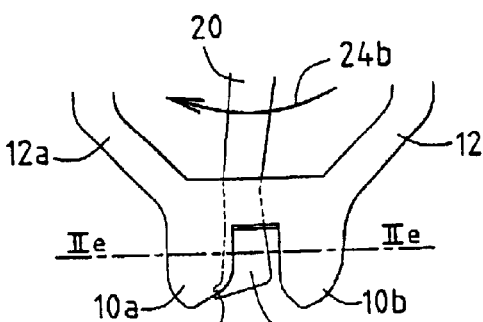
FIG. 2c shows a side view of the eviscerating member from FIG. 1, in its closed position.
Figure 2D:
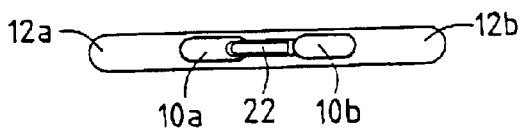
FIG. 2d shows a front view of a section of the eviscerating member from FIG. 1, in its closed position.
Figure 2B:
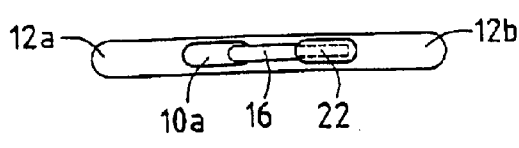
FIG. 2b shows a front view of a section of the partially cutaway eviscerating member from FIG. 1, in its open position.

As shown in FIGS. 2a and 2b, the jaw part 22, in the open position of the eviscerating member 2, is substantially accommodated in that part of the slot 16 which lies in the protuberance 10b, so that the U-shaped opening delimited by the protuberances 10a, 10b and the bridge 14 is substantially open.

Figure 2E:
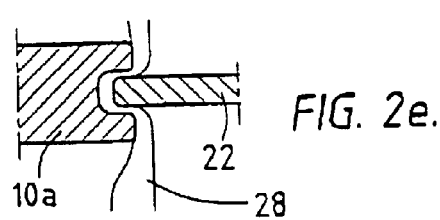
FIG. 2e shows, in cross section on line IIe—IIe in FIG. 2c, a detail of the front view shown in FIG. 2d when tissue is being clamped.

As shown in FIGS. 2c and 2d, in the closed position of the eviscerating member 2, the jaw part 22 is located in the vicinity of the protuberance 10a and is partially accommodated in that part of the slot 16 which is inside the protuberance 10a. The protuberance 10a in this case functions as a second jaw part opposite jaw part 22, for clamping tissue 28 between the protuberance 10a and the jaw part 22, as illustrated in FIG. 2e. It can be seen clearly from FIG. 2e that the tissue is pushed into that part of the slot 16 which lies in the protuberance 10a by the jaw part 22, resulting in particularly strong clamping of the tissue 28 which is not lost even with relatively smooth tissue 28. It should be noted that the hook-shaped projection 26 of the jaw part 22 contributes to gripping the tissue 28 captively between the jaw part 22 and the jaw part which is formed by the protuberance 10a.

Figure 3:
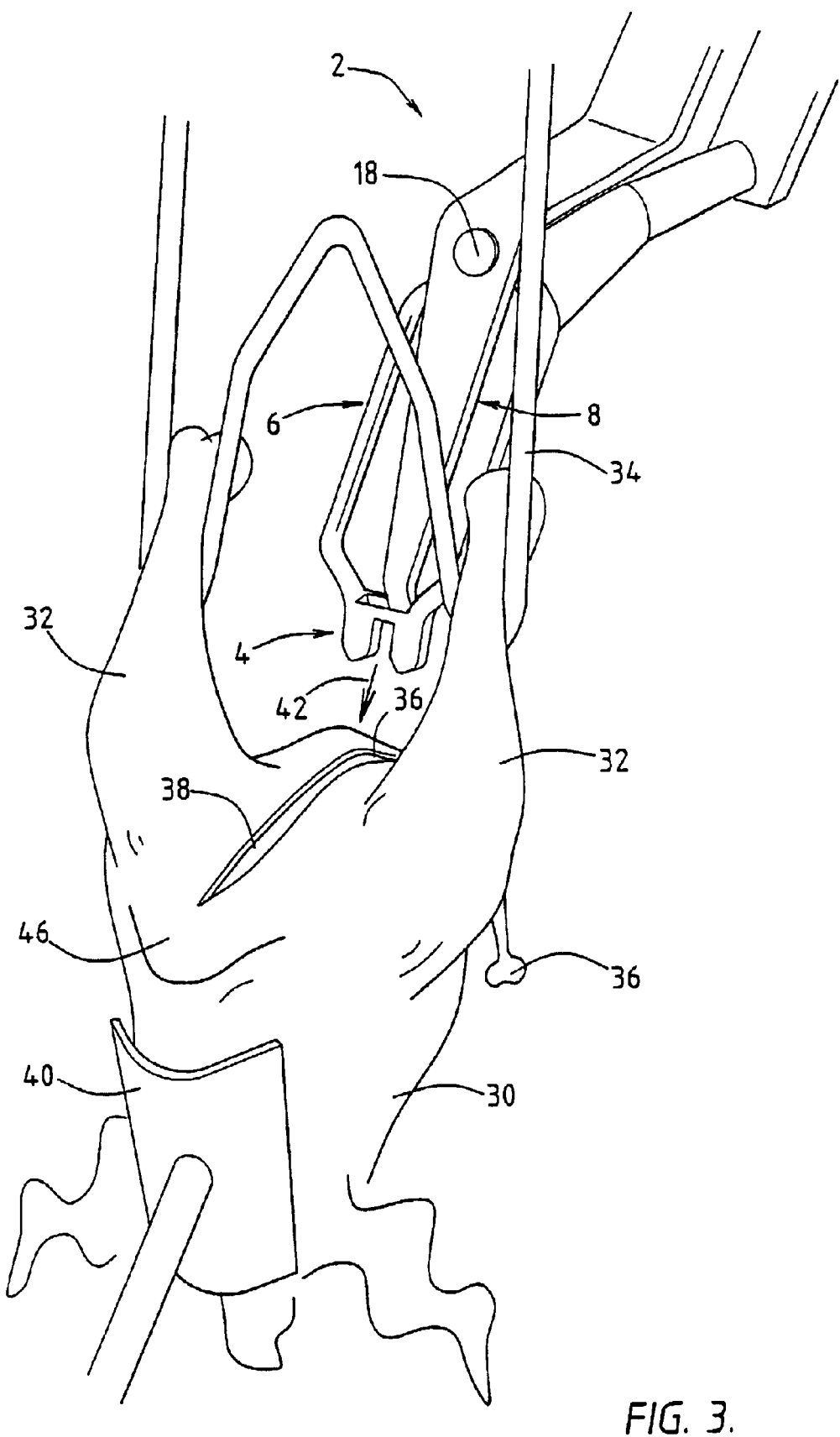
FIG. 3 shows a perspective view of the use of the eviscerating member from FIGS. 1 and 2a–2e.

FIG. 3 shows a slaughtered bird 30 which has been hung by its legs 32 from a double hook 34. The bird 30 has undergone a prior treatment in which, inter alia, the cloaca has been cut out and a section of the intestine 36 has been pulled out of the body cavity and is hanging by the back side of the bird 30. Also, an opening incision 38 has been made from the cloaca in the abdomen of the bird 30. The breast of the bird 30 is supported by a support 40 which is connected to a structural part (not shown in more detail) of an eviscerating device of which the eviscerating member 2 also forms part.

As illustrated in FIG. 3, the eviscerating member 2 is moved towards the abdomen of the bird 30 in the direction of arrow 42 and at least part of the eviscerating head 4 is moved into the opening incision 38 in the vicinity of the cloaca. The eviscerating member 2 may have been moved into either the open position or the closed position, the open position being preferred, since this entails the minimum risk of damage to viscera.

As FIG. 4a illustrates, the eviscerating member 2, which is projecting partially into the opening incision 38, is moved along a path section 44 along the opening incision 38 towards the tip of the breast 46 of the bird 30, and then along a path section 48 along the inside of the breastbone 50 along a cluster of viscera 52 which is still substantially in its natural position in the body cavity of the bird 30. The path section 48 can be covered with the eviscerating member 2 in the open or closed position, the closed position being preferred, since this makes it very easy to break connective tissue in the body cavity of the bird 30. The viscera 52 comprises intestines 54, lungs 56, heart 58, gullet 60 and crop 62.

Figure 4D:
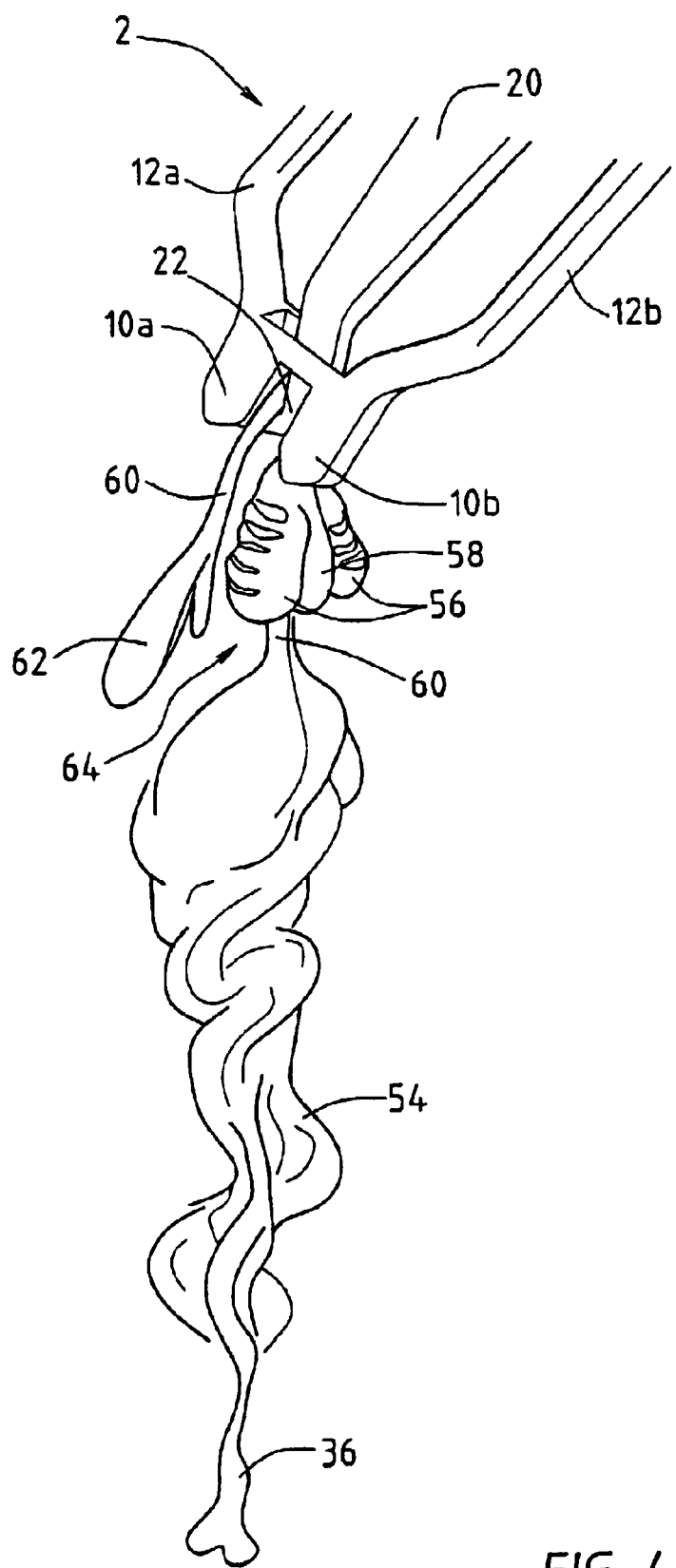
FIG. 4d shows a perspective view of the way in which a cluster of viscera of the slaughtered bird have been fixed using the eviscerating member shown in FIGS. 1 and 2a–2e.
Figures 4E, 4F:
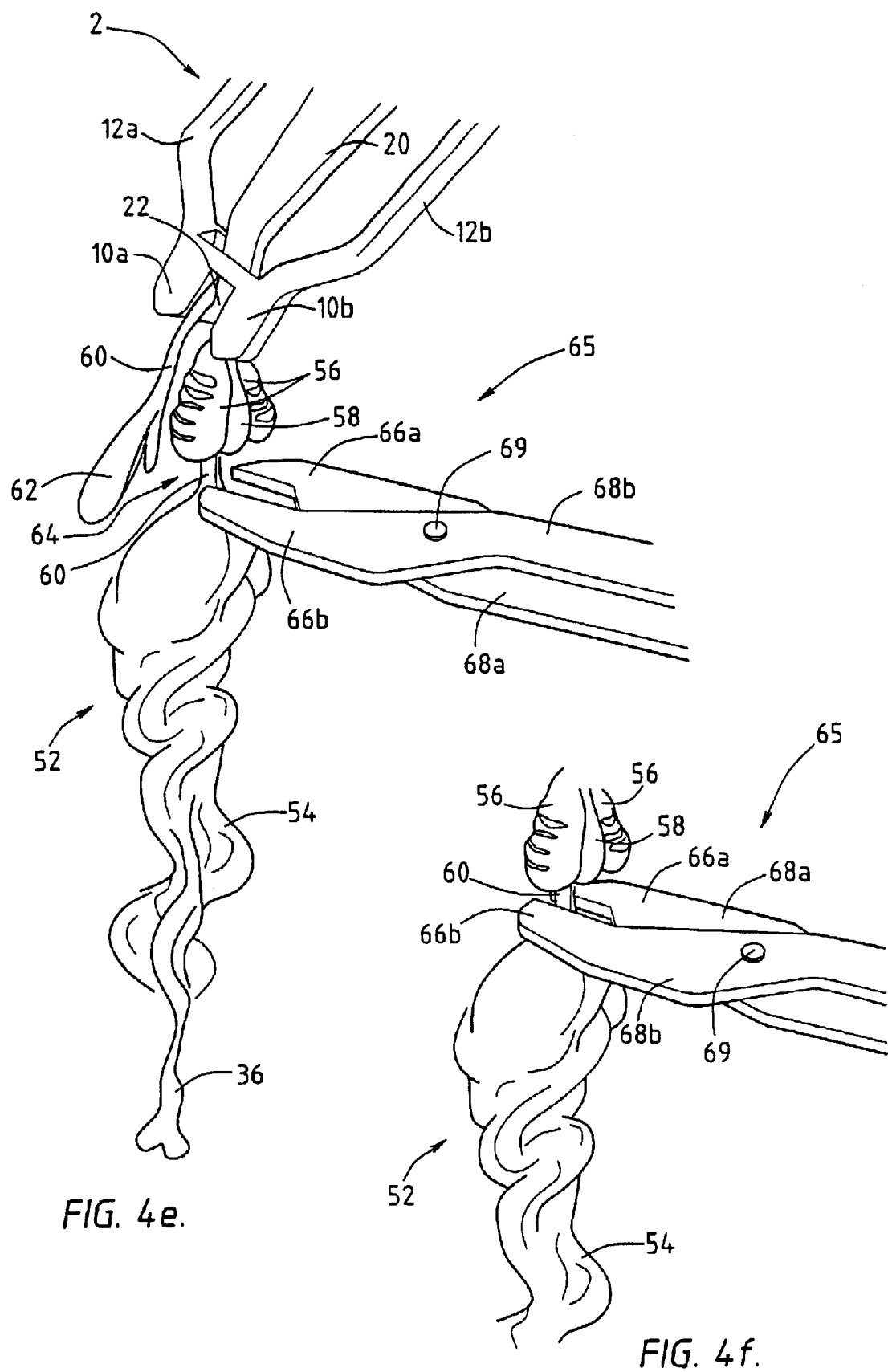
FIGS. 4e and 4f show perspective views of the way in which a viscera carrier engages on a cluster of viscera hanging from an eviscerating member.

As illustrated by FIGS. 4b and 4c, the front end of the eviscerating head 4 of the eviscerating member 2, after it has covered the path section 48, has passed the heart 58 but not the crop 62. The eviscerating member 2 is tilted while it is covering the path section 48, so that the eviscerating head 4 as far as possible follows the contour of the breastbone 50. The pin 18 is situated outside the body cavity of the bird 30, so that this rotation point cannot become contaminated by substances inside the body cavity. The eviscerating member 2 is or has been moved into its open position, so that the gullet 60 and surrounding blood vessels connected to the heart 58 and other tissues, such as tendons, move between the protuberances 10a, 10b of the eviscerating head 4. Then, the eviscerating member 2 is moved into its closed position as a result of the jaw part 22 being moved in the direction of the arrow 24a, as illustrated by FIG. 4c, with the result that the parts which are situated between the protuberances 10a, 10b are clamped securely between the jaw part 22 and the jaw part/protuberance 10a. Until this processing stage, the viscera are substantially in a natural, anatomically undisturbed situation, apart from some broken connective tissue along the breastbone caused by the introduction of the eviscerating member into the body cavity of the bird 30. When the eviscerating member 2 is then moved out of the body cavity of the bird 30, the eviscerating member 2 brings the viscera 52 with it. In the process, the gullet breaks off above the crop 62. The cluster of viscera 52 hangs separately from the bird 30, from the eviscerating member 2, as illustrated in FIG. 4d. On account of the tissue-breaking path of the eviscerating member 2 in the body cavity of the bird 30 and the clamping of the gullet 60 and other tissues above the heart 58, when the cluster of viscera 52 is in a hanging position the viscera are arranged as shown in FIG. 4d. As can be seen from the figure, in this position it is possible for the fixing of the viscera 52 by the eviscerating member 2 to be transferred, at a location indicated by an arrow beneath the heart 58 and the lungs 56, to a different viscera carrier, which engages, whether by clamping or otherwise, around the gullet 60 and conveys the viscera 52 to, for example, an inspection station or a processing station. Fixing the cluster of viscera 52 at the location indicated by the arrow 64 results in the lungs 56 and the heart 58 being on one side of the fixing means and the remainder of the cluster of viscera 52 being on an opposite side of the fixing means, so that it is very easy to separate the lungs 56 and the heart 58 from the other viscera in a processing station. FIG. 4e shows, in addition to the situation shown in FIG. 4d, a viscera carrier 65 having jaw parts 66a and 66b which are supported by arms 68a, 68b, respectively, and are situated in the vicinity of the location 64. The jaw parts 66a, 66b can be moved with respect to one another about a common pin 69. In FIG. 4f, the jaw parts 66a, 66b securely clamp the gullet 60 of the cluster of viscera 52 beneath the lungs 56 and the heart 58. After this, the fixing of the gullet 60 by the eviscerating member 2 can be released, if appropriate after the gullet 60 and surrounding tissue between the jaw parts 66a, 66b, on the one hand, and the lungs 56 and the heart 58, on the other hand, have been cut through using cutting means, which are not shown in more detail and may optionally be connected to the viscera carrier 65 and may be arranged above the jaw parts 66a, 66b, in order for the lungs 56 and the heart 58 to be processed further separately from the remainder of the cluster of viscera 52. If appropriate, the viscera carrier 65, instead of the jaw parts 66a, 66b, may exclusively comprise cutting means which separate the cluster of viscera 52 at the location 64.

Figure 4G:
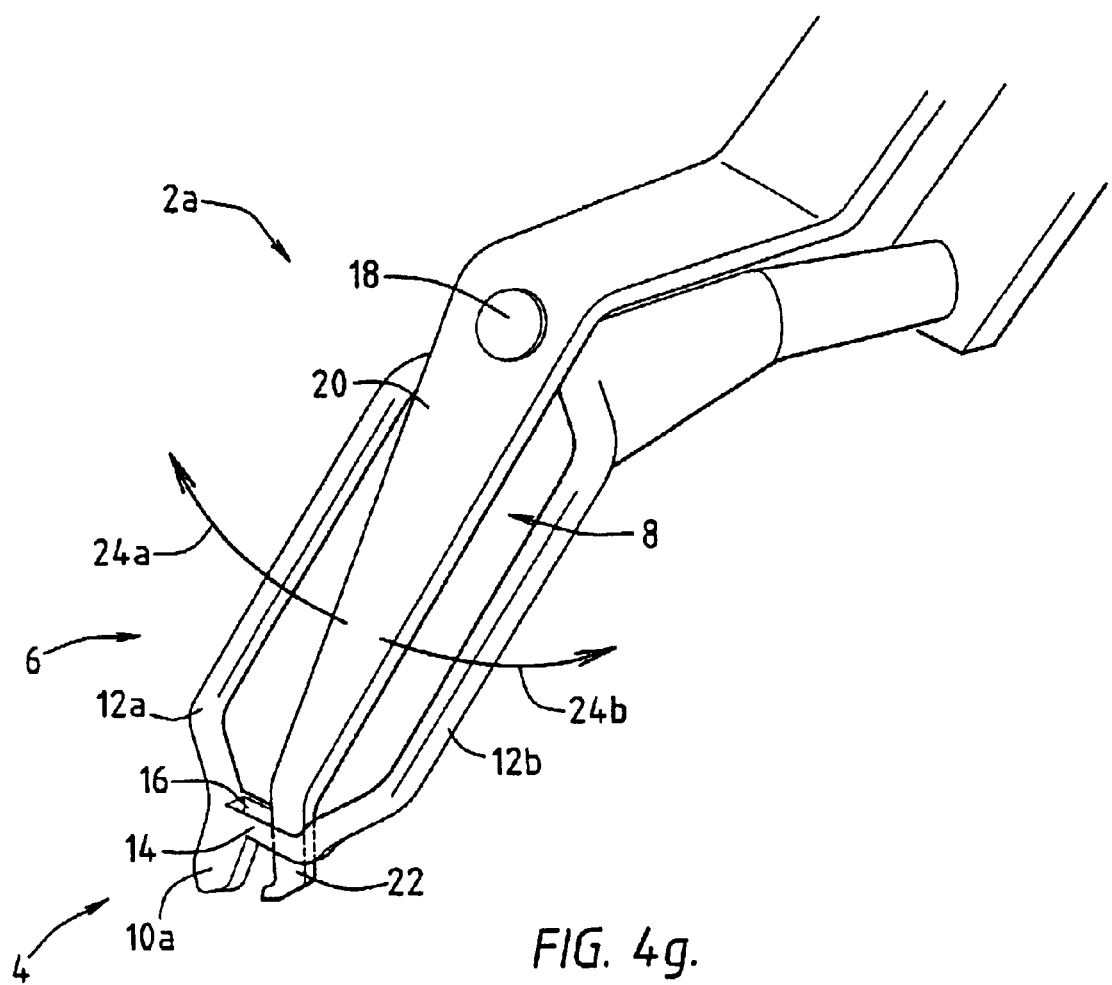
FIG. 4g shows a perspective view of an alternative embodiment of the eviscerating member shown in FIG. 1.
Figure 5:
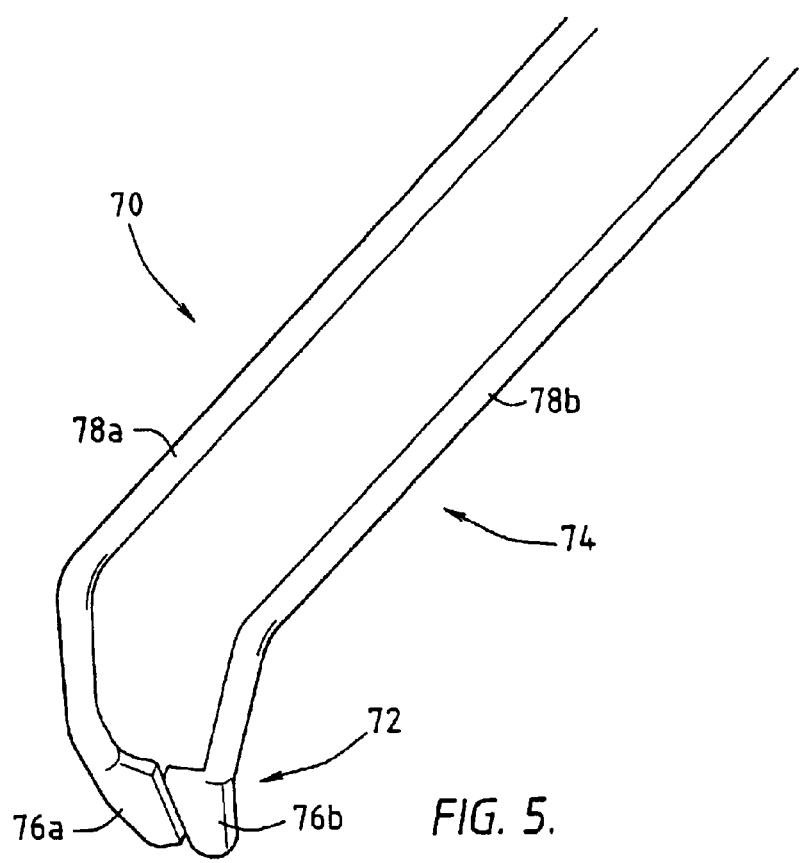
FIG. 5 shows a perspective view of a second embodiment of an eviscerating member according to the invention.

FIG. 4g shows an eviscerating member 2a which is substantially identical to the eviscerating member 2 shown in FIG. 1. However, the eviscerating member 2a only has the protuberance 10a, and the protuberance 10b shown in FIG. 1 is not present. The eviscerating member 2a is used in a similar way to the eviscerating member 2, as described above with reference to FIGS. 2–4f. In the open position of the eviscerating member 2a, the jaw part 22 functions as the protuberance 10b. The eviscerating member 2a is preferably moved into a slaughtered animal in its closed position.

FIGS. 5 and 6a–6d show an eviscerating member 70 having an eviscerating head 72 and a support member 74. The eviscerating head 72 comprises two jaw parts 76a, 76b which are fixedly connected to angled arms 78a and 78b, respectively, of the support member 74. The eviscerating member 70 is also referred to as a spoon.

As shown in more detail in FIGS. 6a–6d the jaw part 76a is provided with a slot 80 on that side which faces towards the jaw part 76b. That side of the jaw part 76b which faces towards the jaw part 76a is provided with a rib 82 of dimensions which are such that it can be accommodated substantially inside the slot 80. At one end, the rib 82 is provided with a projection 84 which can be accommodated in a corresponding recess 86 in the jaw part 76a.

Figure 6A:
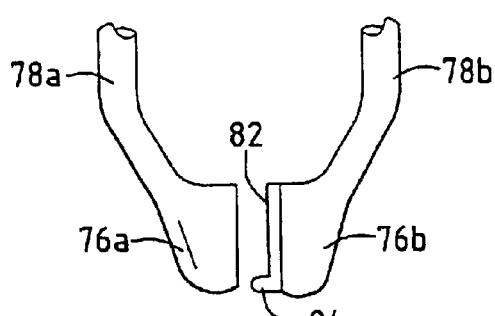
FIG. 6a shows a side view of a section of the eviscerating member from FIG. 5, in its open position.
Figure 6C:
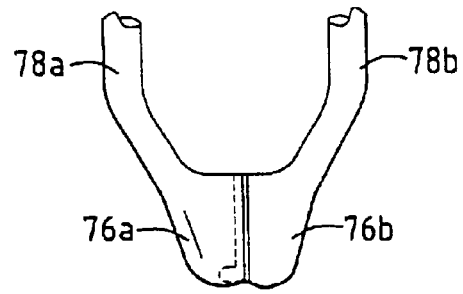
FIG. 6c shows a side view of a section of the eviscerating member from FIG. 5, in its closed position.
Figure 6B:
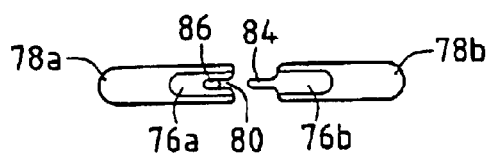
FIG. 6b shows a front view of a section of the eviscerating member from FIG. 5, in its open position.
Figure 6D:
FIG. 6d shows a front view of a section of the eviscerating member from FIG. 5, in its closed position.

The eviscerating member 70 can be moved, by an actuating means which is not shown in more detail, into an open position, in which the jaw parts 76a, 76b are situated at a distance from one another, as shown in FIGS. 6a and 6b, as a result of the arms 78a, 78b being moved apart. By the actuating means (not shown in more detail), the eviscerating member 70 can be moved into a closed position, in which the jaw parts 76a, 76b are situated substantially against one another, as shown in FIGS. 6c and 6d as a result of the arms 78a, 78b being moved towards one another. The movement of the arms 78a, 78b may, for example, be pivoting or translating.

Figure 7:
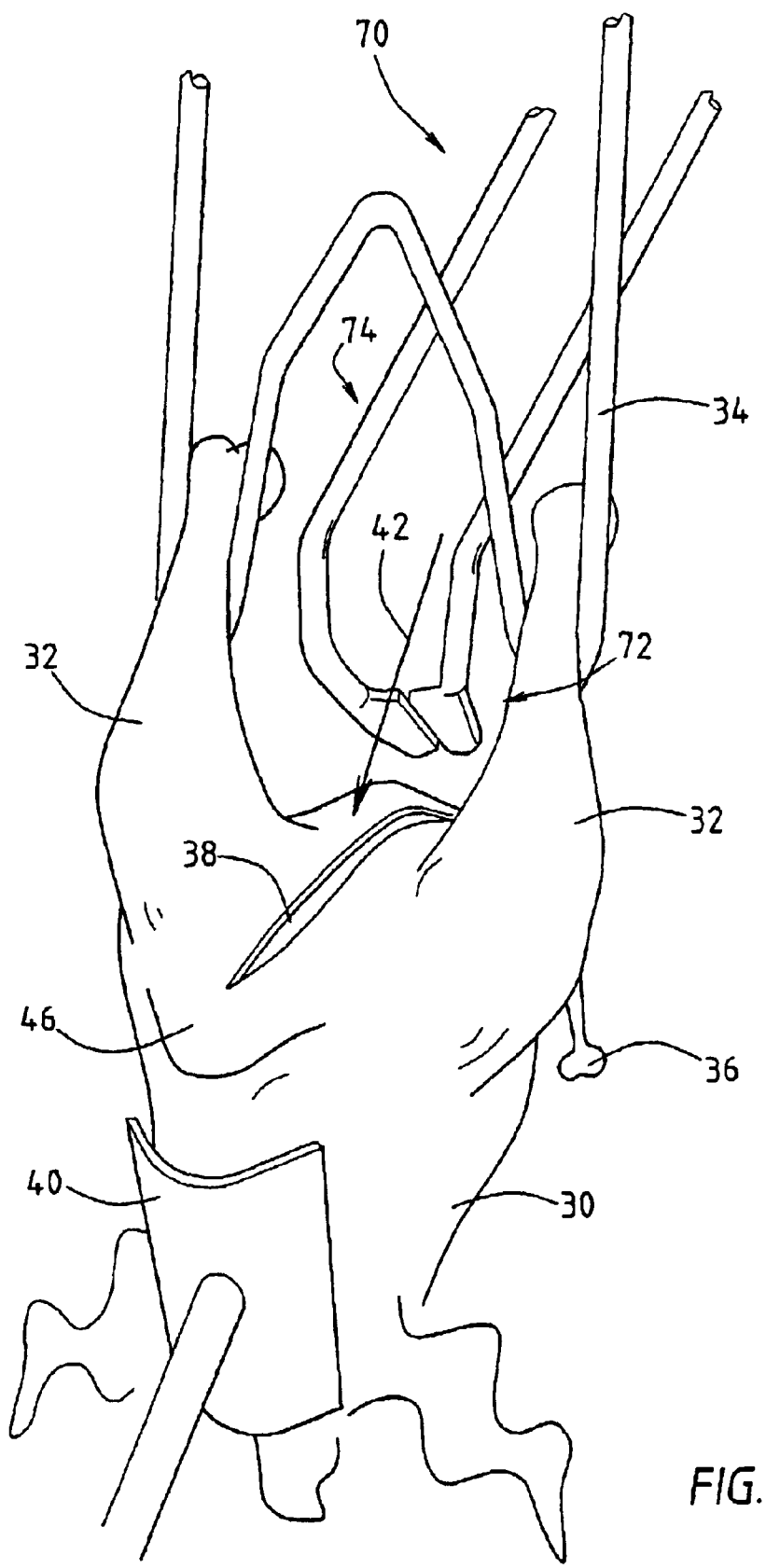
FIG. 7 shows a perspective view of the use of the eviscerating member from FIGS. 5 and 6a–6d.

In connection with FIG. 7, it should be noted that the use of the eviscerating member 70 for eviscerating a cluster of viscera 52 from a slaughtered bird 30 is substantially identical to that described above with reference to FIGS. 3 and 4a–4d for the eviscerating member 2, in particular with regard to the path to be followed and the orientation inside the bird 30, and the open and closed positions of the eviscerating member in various stages of the eviscerating operation.

An eviscerating device may comprise a number of a type of the eviscerating members which have been described above and are still to be described below and suitable actuating means, for example in a carousel arrangement or a linear arrangement for the evisceration of slaughtered animals which are guided past the eviscerating device hanging from hooks of a conveyor. An example of such an eviscerating device is shown in FIGS. 7a–7g.

Figure 7C:
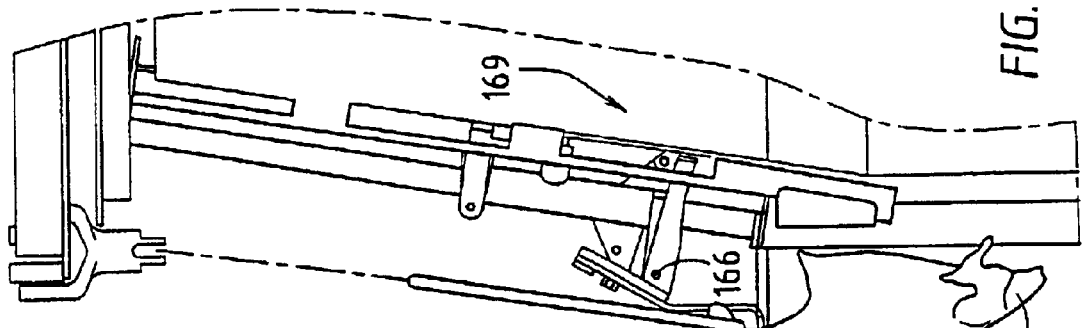
FIGS. 7b–7g show side views, partially in cross-section, of the device shown in FIG. 7a, in various stages of the evisceration of a cluster of viscera from a bird.
Figure 7B:
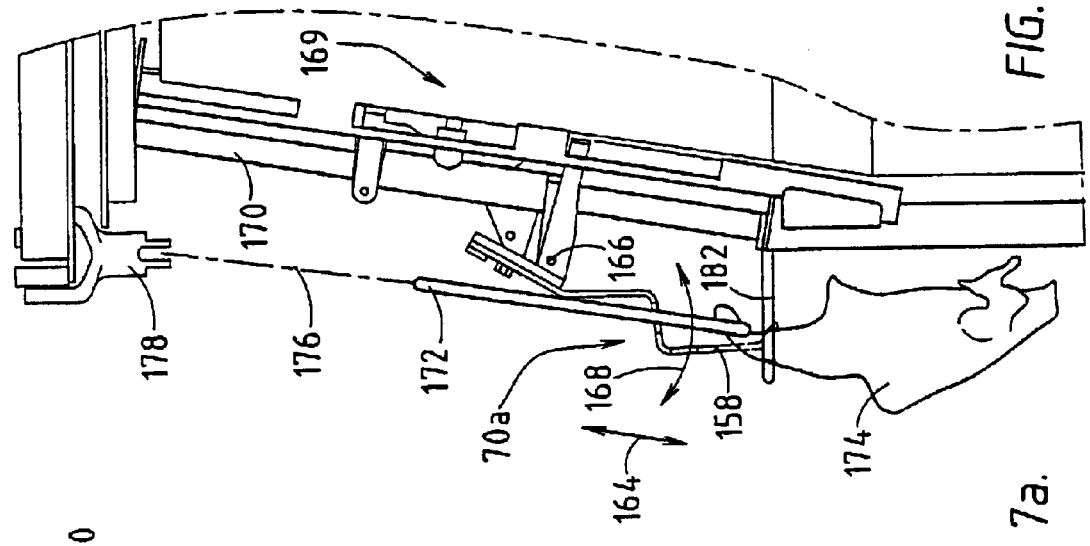
Figure 7A:
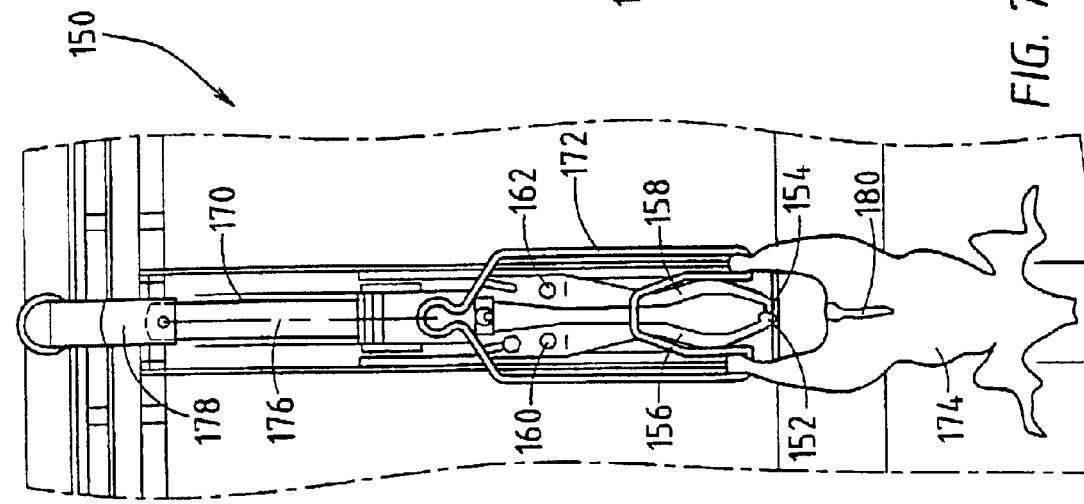
FIG. 7a shows a front view of a section of a device for processing clusters of viscera of birds, in which a number of eviscerating members are incorporated.

As shown in FIGS. 7a and 7b, the eviscerating device 150 comprises a number of eviscerating members 70a of the type shown in FIG. 7, having jaw parts 152 and 154 and arms 156 and 158. The arms 156, 158 can hinge about pins 160 and 162, respectively, for the purpose of moving the jaw parts 152, 154 away from and towards one another. The arms 156, 158 can move both downwards and upwards (in the directions of double arrow 164) and can hinge about a pin 166 (in the directions of double arrow 168), by means of a suitable cam track control 169 along a guide 170. Further details of the design of the cam track control are of no importance in the context of the present invention and will be obvious to the person skilled in the art, and consequently they will not be discussed here; it is only important that the cam track control be able to provide a defined movement of the arms 156, 158, which will be described below. In the region of the path of the jaw parts 152, 154 there is a bird 174 which is hanging by its legs by a hook 172, which hook 172 in turn is connected, via a chain 176, to a trolley 178, which is known per se of a conveyor. The movement of the eviscerating member 70a is synchronized with the movement of the trolley 178, so that the bird 174, in motion, always adopts the same position with respect to the eviscerating member 70a during an eviscerating operation. The bird 174 is provided with an eviscerating opening 180 and is hanging with its breast side facing away from the eviscerating device 150. Between the legs of the bird 174 there is a bracket 182.

Figure 7D:
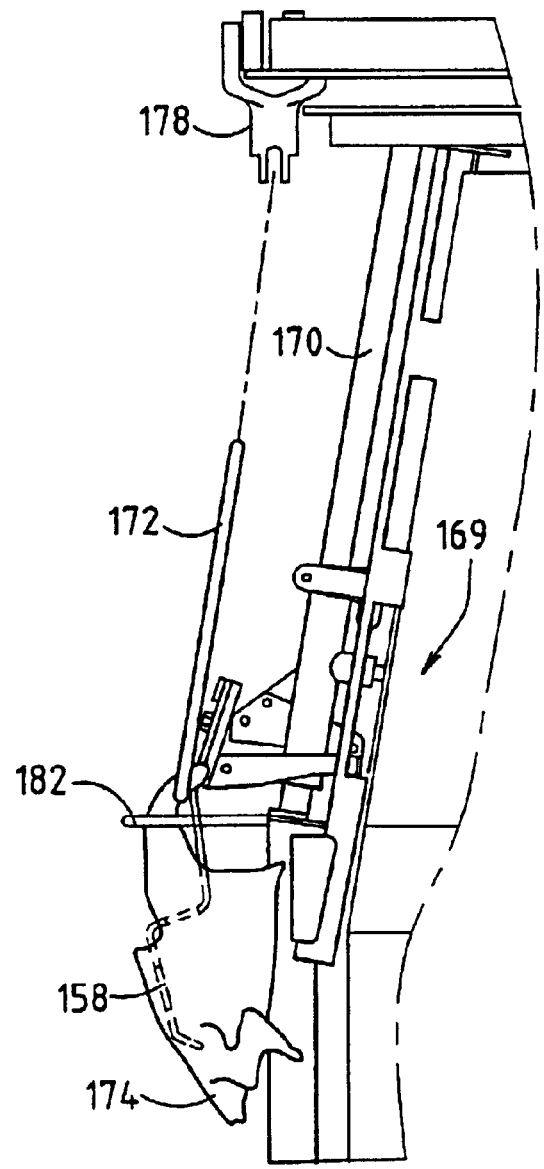
Figure 7E:
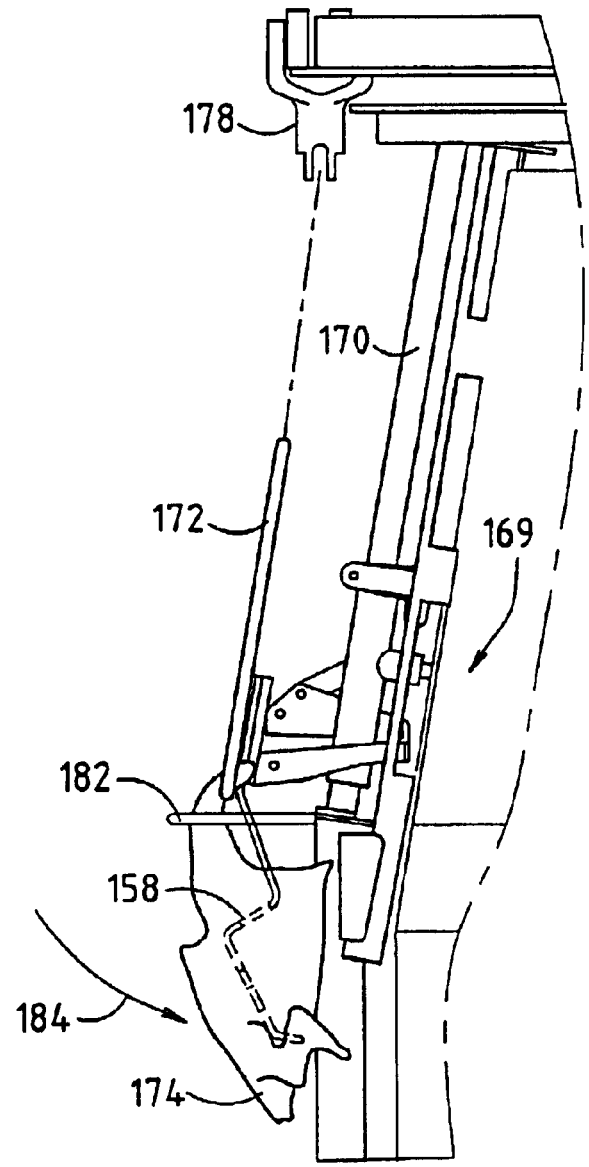
Figure 7F:
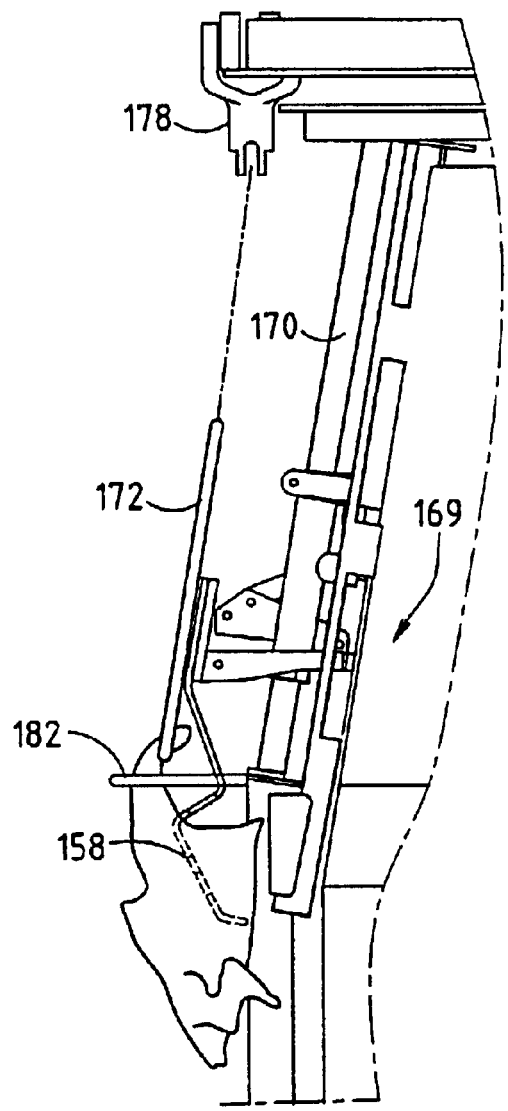
Figure 7G:
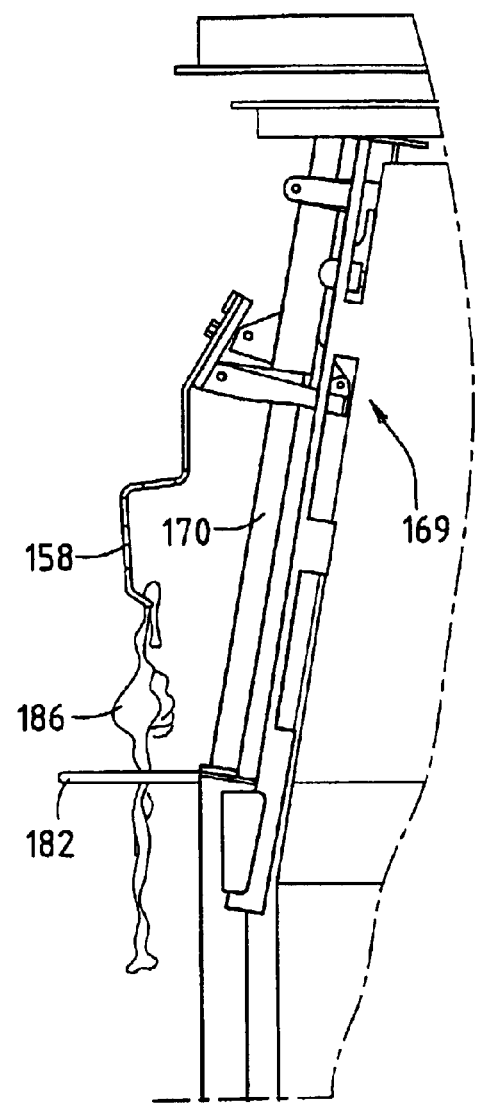

As a result of the arms 156, 158 being moved downwards out of the position shown in FIG. 7b, with the aid of the cam track control 169, into the position shown in FIG. 7c, the jaw parts 152, 154, in the closed position of the eviscerating member 70a, move into the eviscerating opening 180 until they are close to the tip of the breast of the bird 174. From this position, the arms 156, 158 are tilted slightly, with the aid of the cam track control 169, in the direction of arrow 184, and the arms 156, 158 are moved downwards inside the bird, as illustrated in FIG. 7d. Those sections of the arms 156, 158 which are inside the bird 174 are oriented substantially parallel to the inside of the abdominal cavity on the side of the breast of the bird 174, with the cluster of viscera inside the abdominal cavity remaining entirely in its natural position. When the arms 156, 158 are tilted further with the aid of the cam track control 169 in the direction of the arrow 184, as illustrated in FIG. 7e, the jaw parts 152, 154 are moved away from one another and, at the end of the movement, are moved back towards one another, during which process the gullet of the bird 174 is clamped securely between the jaw parts 152, 154. The organs of the cluster of viscera still remain in their natural position. Then, the arms 156, 158 are moved upwards with the aid of the cam track control 169, as illustrated in FIG. 7f. In the process, the cluster of viscera is moved with them, the gullet being broken off the bird 174 on that side of the jaw parts 152, 154 which is remote from the arms 156, 158. After the cluster of viscera has left the carcass of the bird 174, the carcass can be moved away from the eviscerating device 150 while the cluster of viscera 186 remains hanging from the arms 156, 158, since the gullet is clamped between the jaw parts 152, 154, as illustrated in FIG. 7g.

Figure 7H:
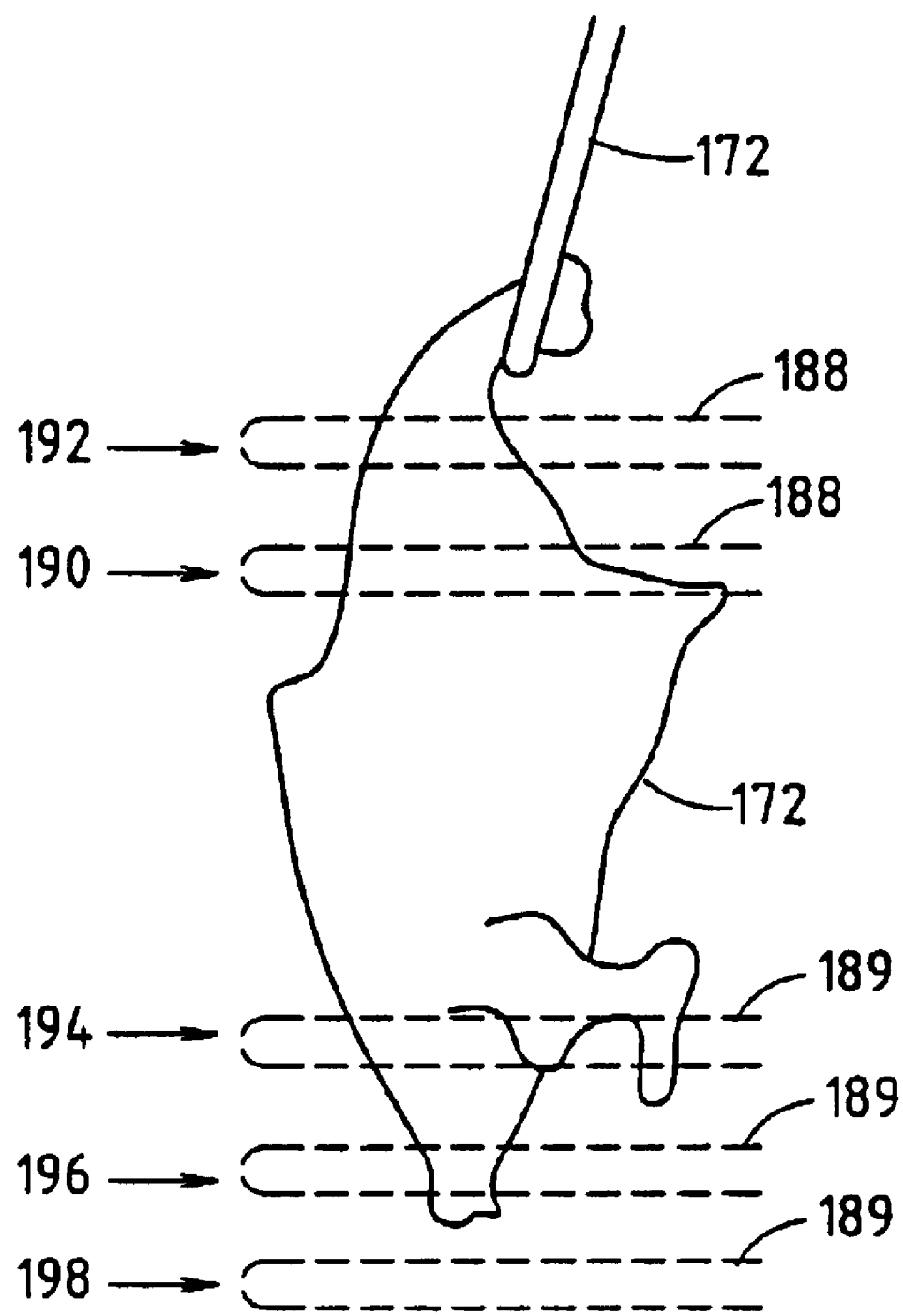
FIG. 7h shows a side view of a way in which a bird is supported.

FIG. 7h shows a bird 174 which is hanging from a hook 172. During an eviscerating operation, the bird 174 is supported on the one hand on the abdomen side by means of one or more brackets 188 (referred to below as bracket 188), which can adopt a position designated by 190 and a position designated by 192 with the aid of controlled displacement means (not shown in more detail), and on the other hand is supported on the shoulder side by means of one or more brackets 189 (referred to below as bracket 189) which can adopt a position denoted by 194 and a position denoted by 196 or 198, with the aid of the said displacement means (not shown in more detail). When picking up a bird 174 at the brackets 188, 189, the positions 192 and 198 or 192 and 196 are selected, so that it is possible to pick up both large and small birds. Then, bracket 188 is fixed in a position, for example position 190, and bracket 189 is moved to position 194 in order to push the bird 174 against the bracket 188 irrespective of the size of the bird 174 and therefore irrespective of the distance between the shoulders and the abdomen of the bird 174. Therefore, during a subsequent eviscerating operation, the abdomen side of the bird 174 is accurately positioned, irrespective of the size of the bird, for an eviscerating member to enter correctly. While the eviscerating member is moving into the bird 174, bracket 188 is moved upwards, for example to position 192, and bracket 189 is moved into a predetermined position, for example position 194. Consequently, the shoulders, and therefore the neck area and the gullet of the bird 174, are accurately positioned irrespective of the size of the bird, so that the jaw parts of the eviscerating member can clamp the gullet correctly. Then, bracket 188 is moved to a predetermined position, for example 190, during the evisceration of the viscera from the bird 174, so that it is certain that, in a defined position of the eviscerating member, the whole cluster of viscera has been removed from the bird 174 irrespective of the size of the bird. The interacting brackets 188, 189 therefore provide a very reliable eviscerating operation for a fixed path of an eviscerating member, it being possible to process birds of different sizes. It will be clear that the described use of the brackets 188, 189 may be in combination not only with an eviscerating member according to the present invention but also with other, possibly conventional eviscerating members.

FIGS. 8, 9a–9b and 10a–10c show an eviscerating member 90 having an eviscerating head 92 and a support member 94. The eviscerating head 92 comprises two jaw parts 96a, 96b which are fixedly connected to angled arms 98a and 98b, respectively, of the support member 94.

As shown in more detail in FIGS. 10a and 10c, the jaw part 96a is provided with a slot 100 on the side facing towards the jaw part 96b. That side of the jaw part 96b which faces towards the jaw part 96a is provided with a rib 102 of dimensions which are such that it can be accommodated substantially inside the slot 100. At one end, the rib 102 is provided with a projection 104 which can be accommodated in a corresponding recess 106 of the jaw part 96a.

The eviscerating head 92 is provided with a covering member 108 which can hinge freely through a predetermined angle about a pin 110, which is connected to the jaw part 96a, between a position which is shown in FIGS. 8 and 9a, on the one hand, and a position which is shown in FIG. 10b on the other hand.

The eviscerating member 90 can be moved, by an actuating means which is not shown in more detail and acts on the arms 98a, 98b, into an open position, in which the jaw parts 96a, 96b are at a distance from one another, as shown in FIG. 10a, as a result of the arms 98a, 98b being moved apart. The eviscerating member 90 can be moved, by the actuating means which is not shown in more detail, into a closed position, in which the jaw parts 96a, 96b are situated substantially against one another, as shown in FIG. 10c, as a result of the arms 98a, 98b being moved towards one another. The movement of the arms 98a, 98b may, for example be pivoting or translating. For the sake of simplicity, the arms 98a, 98b are shown as being substantially straight in the figures, but may also be angled like the arms illustrated in the previous figures.

As shown in FIG. 10a, to stabilize the eviscerating head 92, the pin 110 can extend into a hole in the jaw part 96b. The eviscerating head 92 may also be provided with means (not shown in more detail) for fixing the covering member 108 in the position which is shown in FIG. 8 for a closed position of the jaw parts 96a, 96b.

When the eviscerating member 90 is being used, it is moved into the body cavity of a bird 30 in such a manner that the covering member 108 is situated on that side of the eviscerating head 92 which faces away from the cluster of viscera 52. In the process, the covering member 108 is pushed against the jaw parts 96a, 96b, and—as indicated above—may be fixed with respect to the jaw parts. The front end of the covering member 108 covers the front ends of the jaw parts 96a, 96b. When (the front end of) the eviscerating head has passed the heart 58 of the cluster of viscera 52, the jaw parts 96a, 96b are moved to their open position, with the result that the gullet 60 and surrounding blood vessels and tissue move between the jaw parts 96a, 96b and push the covering member 108 aside.

The covering member 108 may be provided with actuating means for moving it in a controllable way into a defined position instead of the passive design discussed above.

Figure 11:
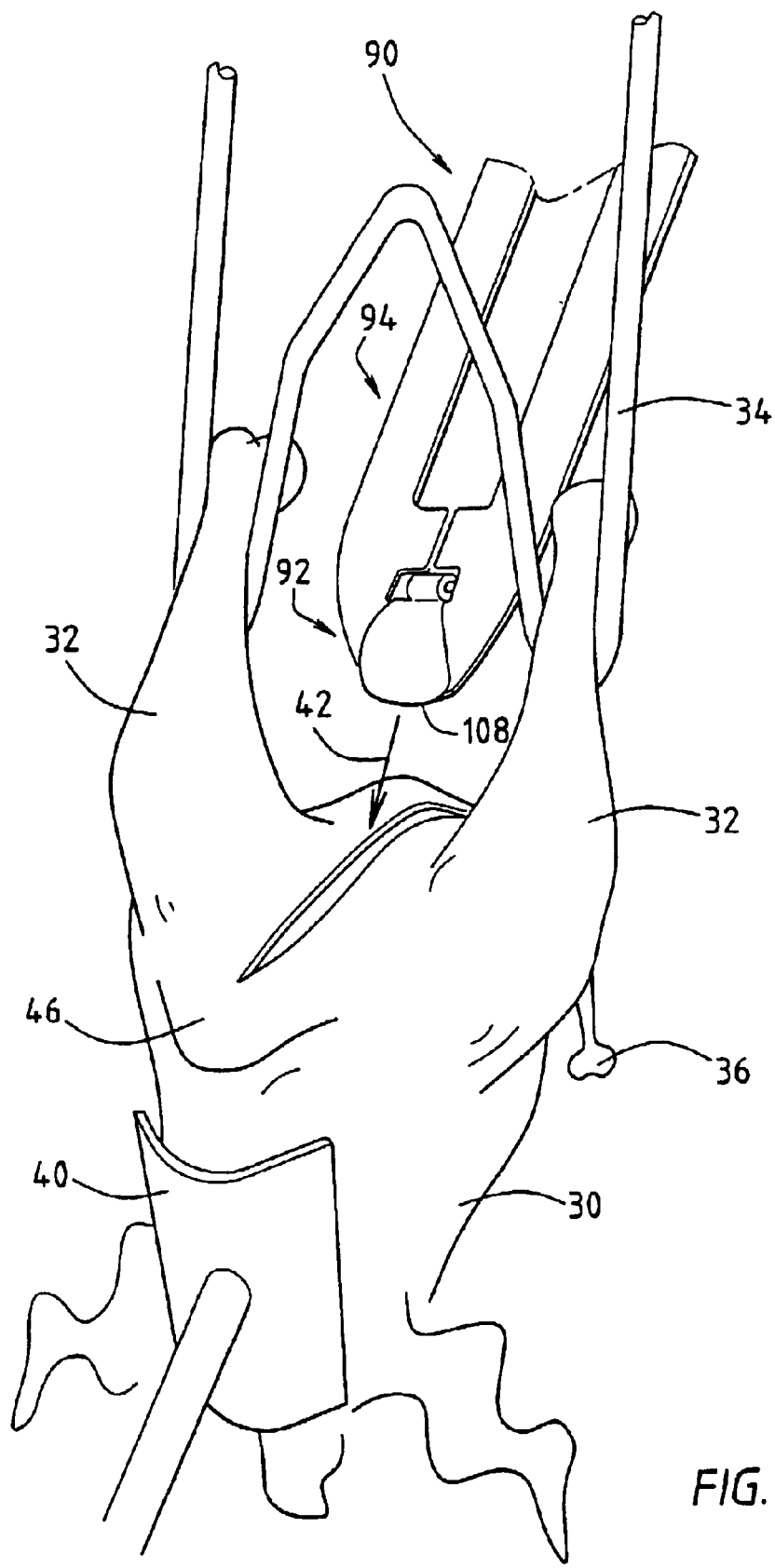
FIG. 11 shows a perspective view of the use of the eviscerating member from FIGS. 8, 9a–9b and 10a–10c.

In connection with FIG. 11, it should be noted that the use of the eviscerating member 90 for eviscerating a cluster of viscera 52 from a slaughtered bird 30 is otherwise substantially identical to that described above with reference to FIGS. 3 and 4a–4d for the eviscerating member 2, in particular with regard to the path and orientation to be followed in the bird 30 and the open and closed positions of the eviscerating member in various stages of the eviscerating operation.

Figure 11A:
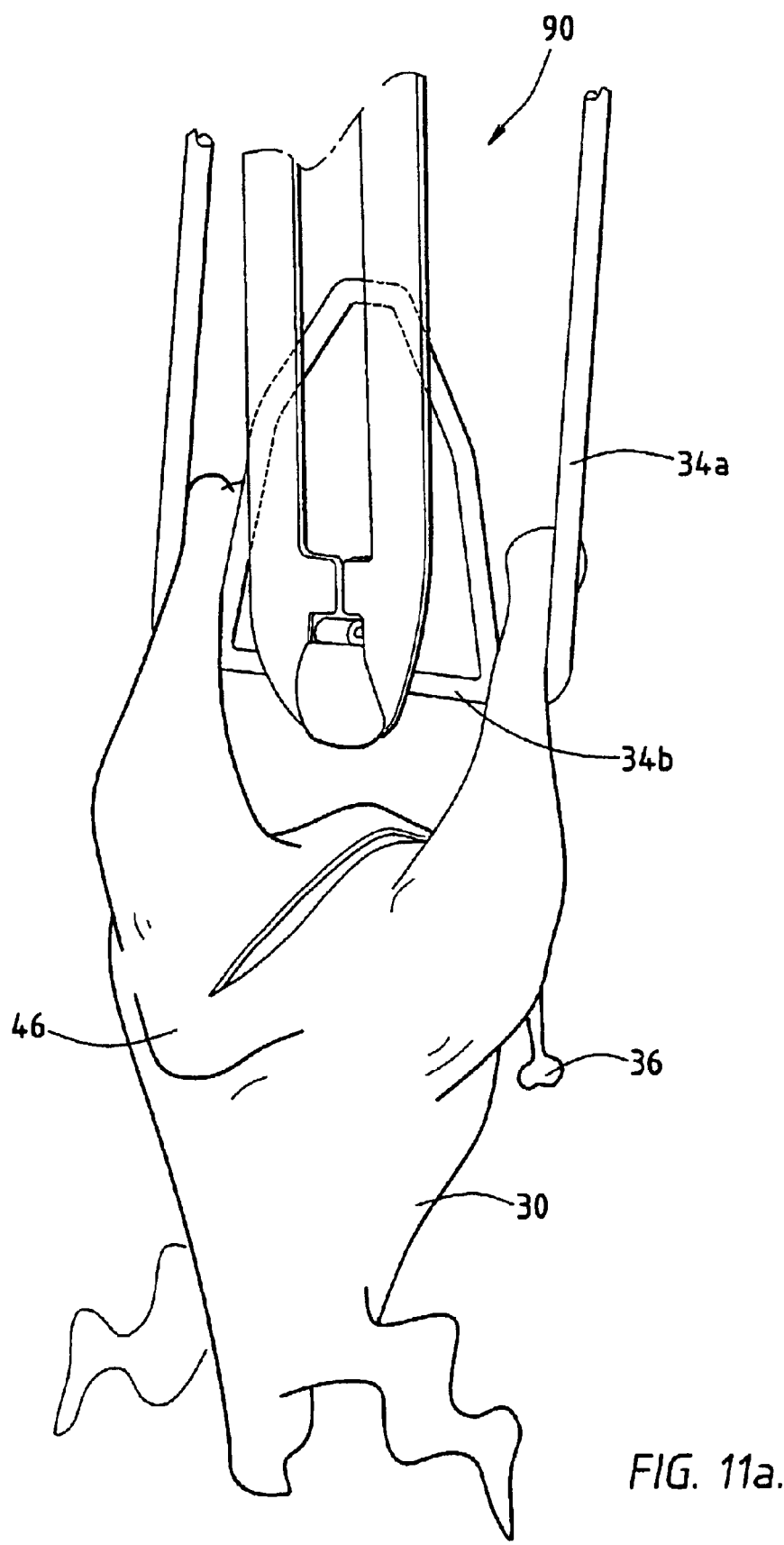
FIG. 11a shows a perspective view of another use of the eviscerating member from FIGS. 8, 9a–9b and 10a–10c.

FIG. 11a illustrates that, when a hook 34a is being used, provided with a transverse bar 34b, the eviscerating member 90 can also be used and actuated on that side of the hook 34a where the breast tip 46 is situated.

Figure 12:
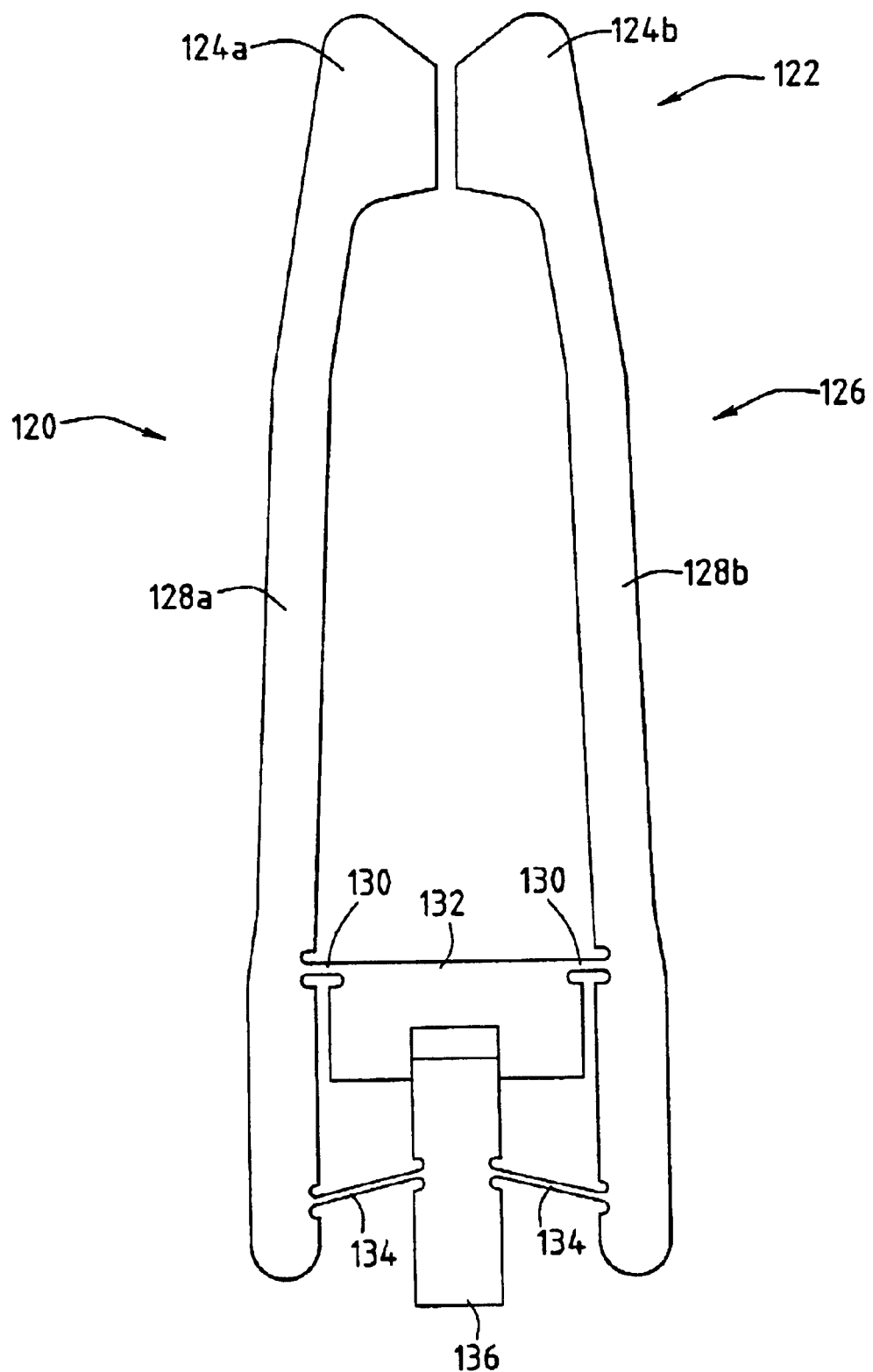
FIG. 12 shows a side view of a fourth embodiment of an eviscerating member according to the invention.

FIG. 12 shows a basic element for an eviscerating member 120 which is obtained from a sheet of material by means of a cutting operation, in particular a laser-cutting operation. The eviscerating member 120 comprises an eviscerating head 122 with jaw parts 124a, 124b which are yet to be shaped further, and a support member 126 with arms 128a, 128b which are yet to be angled and which bear the jaw parts 124a and 124b, respectively. The arms 128a, 128b are each connected to a first body 132 by means of a short, substantially flexurally rigid bridge 130 and to a body 136 by means of a long, substantially flexurally rigid bridge 134. The bridges 130 are oriented substantially perpendicular to the arms to which they are connected, while the bridges 134 are oriented obliquely with respect to the arms to which they are connected. At both ends, the bridges can pivot through a limited angle with respect to the components to which they are connected. In the event of the bodies 132, 136 being moved towards one another by an actuating means (not shown in more detail), the jaw parts 124a, 124b will move apart, while in the event of the bodies 132, 136 being moved away from one another, the jaw parts 124a, 124b will move towards one another. The result is an eviscerating member which is obtained in a particularly inexpensive and simple way.

Figure 13A:
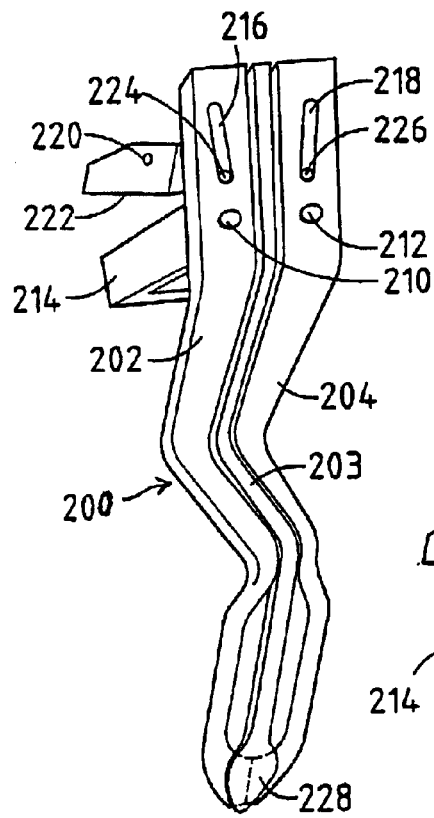
FIGS. 13a–13c show perspective views of a fifth embodiment of the eviscerating member according to the invention, in various positions which occur while it is being used.
Figure 13B:
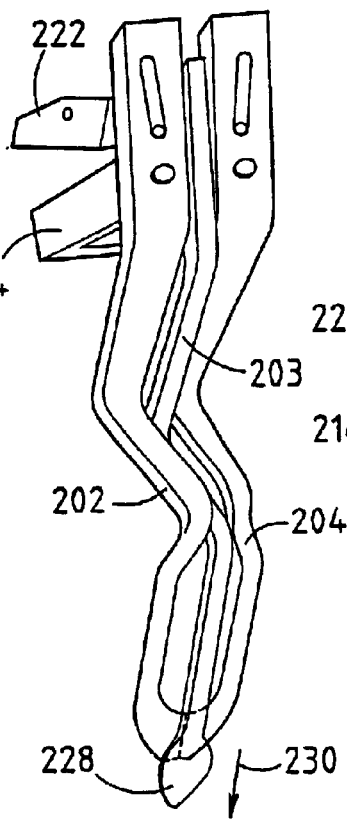
Figure 13C:
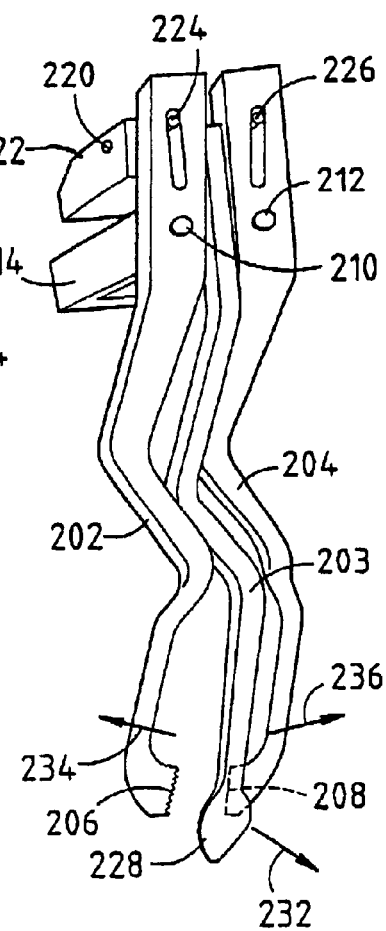

FIGS. 13a–13c show an eviscerating member 200, only part of associated actuating means being shown in order to illustrate the way in which the eviscerating member 200 operates. The eviscerating member 200 comprises two arms 202, 204 which are provided at their free ends with jaw parts 206 and 208, respectively. The arms 202, 204 are each hingedly connected, about a pin 210 and 212, respectively, to a carrier 214 which may form part, for example, of a cam track control (not shown in more detail) for raising and lowering the arms 202, 204. Each arm 202, 204 is provided with an inclined slot 216 and 218, respectively, inside which a peg 224 or 226, respectively, which is connected to a second carrier 222, which can pivot about a pin 220 via a cam track control, can move. Between the arms 202, 204 there is a third arm 203 which, at its free end, bears a spoon-like member 228.

When the eviscerating member 200 is being used, it is moved into a slaughtered animal in the position shown in FIG. 13a. When the neck area of the slaughtered animal has been reached, the arm 203 is moved a short distance downwards with the aid of actuating means (not shown in more detail), as illustrated by arrow 230 in FIG. 13b. Then, the member 228 is moved away from the jaw parts 206, 208, preferably in a hinged movement, in the direction of arrow 232, in order to push away undesired tissue. The arms 202, 204 are moved away from one another, in the vicinity of the jaw parts 206, 208, in the respective directions of arrows 234, 236 as a result of the second carrier 222 being tilted downwards, with the result that the pegs 224, 226 move upwards inside the slots 216 and 218. The position of the components of the eviscerating member 200 which is reached in this way is shown in FIG. 13c. In a subsequent step, the gullet will be clamped between the jaw parts 206, 208 as a result of the arms 202, 204 being moved towards one another, after which the cluster of viscera of the slaughtered animal can be removed from the abdominal cavity thereof.

In FIGS. 13a–13c, the jaw parts 206, 208 are moved from each other and to each other by moving their respective arms 202, 204 from each other and to each other. It will be clear, however, that said relative movement of the jaw parts 206, 208 can also be attained by fixing one of the arms 202, 204 to the carrier 214, and omitting the respective hinge connection 210, 212, the respective peg 224, 226 and possibly the respective slot 216, 218, whereby only the other one of said arms 202, 204 is moveable relative to the carrier 214 by actuation of the second carrier 222.

Although the above has substantially shown and described eviscerating members for use on poultry, it will be clear that eviscerating members of a similar type can be used for removing the viscera from other animals.

While the invention has been described and illustrated in its preferred embodiments, it should be understood that departures may be made therefrom within the scope of the invention, which is not limited to the details disclosed herein.

What is claimed is:

1. An eviscerating device for processing viscera of a slaughtered animal, comprising:
   at least two gripping parts comprising at least a first gripping part and a second gripping part, with at least one of the first or second gripping parts adapted to move between a first position in which a first gripping part is at a distance from the second gripping part and a second position in which the first gripping part is driven towards the second gripping part;
   support means for supporting the first and second gripping parts;
   first means for moving the support means and the at least two gripping parts at least partially into and out of a body cavity of the slaughtered animal;
   second means for placing the first and second gripping parts in the first position and the second position;
   wherein the first and second means are capable of operating in steps comprising:
      the first means moving the support means and the gripping parts into the body cavity while the viscera remains positioned in the body cavity without displacing the viscera in the body cavity to place at least a part of the viscera between the first and second gripping parts, the second means having previously moved the first and second gripping parts into the first position;
      the second means moving the first and second gripping parts to the second position to grasp the viscera; and
      the first means moving the support means to at least partially remove the viscera from the body cavity of the slaughtered animal.

2. The eviscerating device of claim 1, wherein the first gripping part further comprises a slot facing the second gripping part and adapted to receive at least a portion of the second gripping part.

3. The eviscerating device of claim 1, wherein at least one of the first and second gripping parts further comprises at least one projection coupled to an edge of a side facing the other gripping part.

4. The eviscerating device of claim 1, wherein the support means comprises a first arm and a second arm, the first arm coupled to the first gripping part at a first end of the first arm and the second arm coupled to the second gripping part at a first end of the second arm, wherein that first arm and the second arm are moveable the first and second positions.

5. The eviscerating device of claim 4, wherein the first arm and the second arm are connected together with at least one hinge.

6. The eviscerating device of claim 5, wherein the at least one hinge comprises a bridge that is pivotable with respect to the first and second arm.

7. The eviscerating device of claim 1, wherein the support means comprises a first arm coupled to a second arm, the first arm comprising the first gripping part coupled to a first end of the first arm, and the second gripping part is coupled to the second means.

8. The eviscerating device of claim 1, further comprising a covering member adapted to move between a first covering member position for covering at least a portion of one side of the first and second gripping parts and a second covering member position where the covering member is at a distance from the first and second gripping parts.

9. The eviscerating device of claim 8, wherein the covering member in the first covering member position is adapted to cover at least a portion of a leading side of the first and second gripping parts that is intended to face a backbone of the slaughtered animal during use of the eviscerating device.

10. The eviscerating device of claim 8, wherein the covering member is rotatably connected to the support means.

11. The eviscerating device of claim 8, further comprising a blocking means for preventing movement of the covering member while the first and second gripping parts are in the second position.

12. The eviscerating device of claim 1, wherein the support means and the first and second gripping parts are positioned in different planes.

13. The eviscerating device of claim 1, wherein the first and second gripping parts are capable of moving in a single plane while moving between the first position and the second position.

14. The eviscerating device of claim 1, wherein the first and second gripping parts are capable of moving relative to each other by rotating around a pin positioned relative to the first and second gripping parts so that the pin does not contact the slaughtered animal while the eviscerating device is used to at least partially remove the viscera from the slaughtered animal.

15. The eviscerating device of claim 1, further comprising a viscera carrier for engaging the viscera beneath a heart and lungs after the viscera has been at least partially removed from the slaughtered animal.

16. The device of claim 15, wherein the viscera carrier comprises at least two viscera carrier jaw parts, the viscera carrier jaw parts capable of moving with respect to each other between a first viscera carrier position in which a first viscera carrier jaw part is at a distance from a second viscera carrier jaw part and a second viscera carrier position in which the first viscera carrier jaw part is driven towards the second viscera carrier jaw part.

17. The device of claim 16, wherein the viscera carrier further comprises a cutting means.

18. The device of claim 17, wherein the cutting means is positioned above the viscera carrier jaw parts.

19. A method for removing viscera from a slaughtered animal, comprising:
   positioning an eviscerating device proximate to a slaughtered animal;

moving first and second gripping parts of the eviscerating device into the body cavity of the slaughtered animal between a breastbone and the viscera until the first and second gripping parts are near a neck of the slaughtered animal;

placing the first and second gripping parts in a first position, wherein the first gripping part is at a distance from the second gripping part;

moving the first and second gripping parts adjacent to a gullet and a heart in the slaughtered animal;

engaging the viscera by moving the first and second gripping parts into a second position; and removing the first and second gripping parts and the viscera at least partially from the body cavity of the slaughtered animal.

20. The method of claim 19, wherein the first and second gripping parts are in the second position before the first and second gripping parts are moved into the body cavity of the slaughtered animal.

21. The method of claim 19, wherein the first and second gripping parts are moved into the body cavity of the slaughtered animal substantially without displacing the viscera in the body cavity.

22. The method of claim 19, wherein the first and second gripping parts engage the viscera substantially without displacing the viscera in the body cavity.

23. The method of claim 19, further comprising the steps of:

supporting an abdomen side of the slaughtered animal;

moving the first and second gripping parts of the eviscerating device into the slaughtered animal;

supporting a shoulder of the slaughtered animal;

engaging the gullet of the slaughtered animal;

supporting the abdomen side of the slaughtered animal; and removing the first and second gripping parts at least partially from the body cavity of the slaughtered animal.

24. The method of claim 23, wherein the slaughtered animal is supported by displaceable brackets.

25. An eviscerating device for processing viscera of a slaughtered animal, comprising:

at least two gripping parts comprising a first gripping part and a second gripping part capable of moving between a first position in which the first gripping part is at a distance from the second gripping part and a second position in which the first gripping part is driven towards the second gripping part;

at least one arm for supporting the first and second gripping parts;

an actuating device coupled to the at least one arm for moving the at least one arm, the first gripping part and second gripping part at least partially into and out of a body cavity of the slaughtered animal; and at least one control arm for placing the first and second gripping parts in the first position and the second position;

wherein the at least one control arm and the actuating device are capable of operating in steps comprising:

the actuating device moving the at least one control arm, the first gripping part, and the second gripping part into the body cavity while the viscera remains positioned in the body cavity to grasp the viscera between the first and second gripping parts, the actuating device having previously moved the first and second gripping parts into the first position;

the at least one control arm moving the first and second gripping parts to the second position to grasp the viscera; and the actuating device moving the at least one control arm to remove the viscera from the body cavity of the slaughtered animal.

26. The eviscerating device of claim 25, wherein the first gripping part further comprises a slot adapted to receive at least a portion of the second gripping part.

27. The eviscerating device of claim 25, wherein at least one of the first and second gripping parts further comprises at least one projection coupled to an edge of a side facing the other gripping part.

28. The eviscerating device of claim 25, wherein the at least one arm comprises a first arm and a second arm.

29. The eviscerating device of claim 28, wherein the first and second arms are rotatably coupled together.

30. The eviscerating device of claim 28, wherein the first and second arms are rotatably coupled together with at least one bridge.

31. The eviscerating device of claim 28, wherein the first gripping part is coupled to the first arm and the second jaw part is coupled to the control arm.

32. The eviscerating device of claim 28, wherein the first gripping part is coupled to the first arm and the second gripping part is coupled to the second arm.

33. The eviscerating device of claim 25, further comprising a covering member adapted to move between a first covering member position for covering at least a portion of one side of the first and second gripping parts and a second covering member position where the covering member is at a distance from the first and second gripping parts.

34. The eviscerating device of claim 33, further comprising a device for preventing movement of the covering member while the first and second gripping parts are in the second position.

35. The eviscerating device of claim 25, further comprising a tongue for preventing tissue from being grasped by the first and second gripping parts and positioned between the first and second arms.

36. The eviscerating device of claim 25, wherein the first and second gripping parts are positioned in a first plane and the control arm is positioned in a second plane.

37. The eviscerating device of claim 25, wherein the first and second gripping parts and the control arm are positioned in a single plane.

38. The eviscerating device of claim 25, wherein the first and second gripping parts are capable of moving relative to each other by rotating around a pin positioned relative to the first and second gripping parts so that the pin does not contact the slaughtered animal while the eviscerating device is used to remove the viscera at least partially from the slaughtered animal.

39. The eviscerating device of claim 25, further comprising a viscera carrier for engaging the viscera near a heart and lungs after the viscera has been removed at least partially from the slaughtered animal.

40. The device of claim 39, wherein the viscera carrier comprises at least two viscera carrier jaw parts, the viscera carrier jaw parts capable of moving with respect to each other between a first viscera carrier position in which a first viscera carrier jaw part is at a distance from a second viscera carrier jaw part and a second viscera carrier position in which the first viscera carrier jaw part is driven towards the second viscera carrier jaw part.

41. The device of claim 39, wherein the viscera carrier further comprises a cutting device.

* * * * *